United States Patent
Bharadwaj

(10) Patent No.: US 11,297,006 B1
(45) Date of Patent: Apr. 5, 2022

(54) USE OF VIRTUAL LANES TO SOLVE CREDIT STALL ON TARGET PORTS IN FC SAN

(71) Applicant: Cisco Technology, Inc., San Jose, CA (US)

(72) Inventor: Harsha Bharadwaj, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/891,321

(22) Filed: Jun. 3, 2020

(51) Int. Cl.
*H04L 12/947* (2013.01)
*H04L 49/25* (2022.01)
*H04L 49/9005* (2022.01)
*H04L 49/00* (2022.01)

(52) U.S. Cl.
CPC ............. *H04L 49/25* (2013.01); *H04L 49/70* (2013.01); *H04L 49/9005* (2013.01)

(58) Field of Classification Search
CPC ..... H04L 49/25; H04L 49/70; H04L 49/9005; H04L 47/10; H04L 47/30; H04L 47/39; H04L 47/12; H04L 47/24; H04L 47/2441; H04L 67/1097; H04L 12/5602; H04L 49/506; H04L 12/462; H04L 49/15; H04L 1/24; H04L 49/35; H04L 12/4641; H04L 63/0428; H04L 1/0079; H04L 45/00; H04L 49/357; H04L 29/06; H04L 41/12; H04L 49/351; H04L 49/901; G06F 3/0601; G06F 3/0635
See application file for complete search history.

(56) References Cited

U.S. PATENT DOCUMENTS

| 7,139,271 B1 * | 11/2006 | Parruck | H04L 12/5601 370/392 |
| 7,525,910 B2 * | 4/2009 | Wen | H04L 49/357 370/230 |
| 7,525,983 B2 | 4/2009 | Dropps et al. | |
| 7,558,264 B1 * | 7/2009 | Lolayekar | G06F 11/2087 370/392 |
| 7,564,789 B2 | 7/2009 | Betker | |

(Continued)

OTHER PUBLICATIONS

Mkishima, Dennis, "FC-SW-8 Target Credit Stall—An Introduction", T11-2020-00004-v001, Broadcom, downloaded Jun. 2, 2020, 24 pages.

*Primary Examiner* — Wutchung Chu
(74) *Attorney, Agent, or Firm* — Edell, Shapiro & Finnan, LLC

(57) ABSTRACT

A method is performed at a switch fabric that communicates with a storage array target port. The method includes sending frames to the target port responsive to receiving buffer-to-buffer (B2B) credits that indicate a receive buffer at the target port is available for the frames. The method further includes, in response to detecting a credit stall at the target port, operating in a virtual lane mode. The operating in the virtual lane mode includes: determining whether a frame destined for the target port is a command frame or a data frame; based on the determining, marking the frame to indicate that the frame is destined for a particular virtual lane among virtual lanes of the receive buffer; and receiving from the target port a per-virtual lane B2B credit that indicates the particular virtual lane is available and, in responsive, sending the frame to that virtual lane on the target port.

20 Claims, 17 Drawing Sheets

(56) References Cited

U.S. PATENT DOCUMENTS

| | | | |
|---|---|---|---|
| 7,773,592 B1* | 8/2010 | Dropps | H04L 49/25 370/389 |
| 8,072,988 B2 | 12/2011 | Dropps et al. | |
| 8,081,650 B2 | 12/2011 | Dropps et al. | |
| 2003/0026267 A1* | 2/2003 | Oberman | H04L 47/10 370/397 |
| 2003/0037127 A1* | 2/2003 | Shah | G06F 11/0724 709/220 |
| 2003/0093541 A1* | 5/2003 | Lolayekar | H04L 69/08 709/230 |
| 2003/0093567 A1* | 5/2003 | Lolayekar | H04L 67/1097 709/246 |
| 2003/0195983 A1* | 10/2003 | Krause | H04L 47/26 709/238 |
| 2004/0057389 A1* | 3/2004 | Klotz | H04L 41/22 370/252 |
| 2004/0139260 A1* | 7/2004 | Steinmetz | H04L 45/60 710/269 |
| 2004/0148460 A1* | 7/2004 | Steinmetz | G06F 3/0661 711/114 |
| 2004/0153863 A1* | 8/2004 | Klotz | H04L 41/12 714/45 |
| 2005/0018621 A1 | 1/2005 | Dropps et al. | |
| 2005/0018674 A1* | 1/2005 | Dropps | H04L 49/357 370/389 |
| 2005/0030963 A1* | 2/2005 | Solomon | H04L 47/39 370/428 |
| 2005/0047334 A1* | 3/2005 | Paul | H04L 12/5601 370/229 |
| 2005/0073956 A1* | 4/2005 | Moores | H04L 47/6205 370/235 |
| 2005/0174942 A1* | 8/2005 | Betker | H04L 47/6265 370/235 |
| 2006/0010299 A1* | 1/2006 | Zhang | H04L 67/1097 711/162 |
| 2006/0013135 A1* | 1/2006 | Schmidt | H04L 47/10 370/235 |
| 2008/0089351 A1* | 4/2008 | Hu | H04L 47/266 370/412 |
| 2009/0116507 A1* | 5/2009 | Kanda | H04L 47/263 370/464 |
| 2009/0316592 A1 | 12/2009 | Dropps et al. | |
| 2011/0004732 A1* | 1/2011 | Krakirian | G06F 12/0817 711/147 |
| 2012/0063303 A1* | 3/2012 | Gnanasekaran | H04L 47/286 370/230 |
| 2012/0239833 A1* | 9/2012 | Yoshimura | G06F 3/0673 710/52 |
| 2013/0258850 A1* | 10/2013 | Mayya | H04L 47/12 370/235 |
| 2013/0258851 A1* | 10/2013 | Mayya | H04L 47/32 370/235 |
| 2014/0181419 A1* | 6/2014 | Saund | G06F 13/385 711/146 |
| 2015/0236964 A1* | 8/2015 | Dickens | H04L 47/2441 370/238 |
| 2019/0342217 A1* | 11/2019 | Mazurek | H04L 47/25 |

\* cited by examiner

USE OF VIRTUAL LANES TO SOLVE CREDIT STALL ON TARGET PORTS IN FC SAN

TECHNICAL FIELD

The present disclosure relates to solving credit stalls on target ports of a Fibre Channel (FC) storage array network (SAN) (FC SAN).

BACKGROUND

A Fibre Channel (FC) storage area network (SAN) (FC SAN) includes an initiator device that sends Input (I)/Output (O) (I/O) operations to a storage array (i.e., target device) through a switch fabric. While a controller of the storage device is busy controlling the storage array, the target device may receive a flood of I/O operations that the controller cannot service due to its busy status. As result, the target device withholds buffer-to-buffer (B2B) credits from a switch port of the switch fabric, and thus prevents the switch port form sending further/pending I/O operations and associated data to the target device. This eventually causes backpressure into the fabric and interferes with unrelated flows. This condition is referred to as "target port credit stall," and can be detrimental to overall FC SAN performance.

DESCRIPTION OF EXAMPLE EMBODIMENTS

Overview

A first embodiment includes a method performed at a switch of a switch fabric configured to communicate with a target port of a storage array. The method includes sending frames to the target port responsive to receiving, from the target port, buffer-to-buffer (B2B) credits that indicate a receive buffer at the target port is available for the frames. The method also includes, in response to detecting a credit stall at the target port based on withholding of the B2B credits by the target port, operating in a virtual lane mode. The operating in the virtual lane mode includes: determining whether a frame destined for the target port is a command frame or a data frame; based on the determining, marking the frame to indicate that the frame is destined for a particular virtual lane among virtual lanes of the receive buffer; and receiving from the target port a per-virtual lane B2B credit that indicates the particular virtual lane is available and, in responsive, sending the frame to the particular virtual lane on the target port.

A second embodiment includes a method performed at a Fibre Channel adapter of a storage array, the Fibre Channel adapter including a target port and a receive buffer coupled to the target port, the target port configured to communicate with a link peer, which includes a switch port of a fabric switch. The method includes operating in a virtual lane mode. The operating in the virtual lane mode, includes: partitioning the receive buffer into virtual lanes; receiving, from the link peer, a frame marked with a virtual lane identifier to identify a particular virtual lane of the virtual lanes with which the frame is associated; populating the particular virtual lane based on the virtual lane identifier; processing the frame in the particular virtual lane to remove the frame from the particular virtual lane; and sending, to the link peer, a per-virtual lane buffer-to-buffer credit encoded to indicate the particular virtual lane is available for a subsequent frame. The operating in the virtual mode also includes mapping the command lane and the data lane to a command queue and a direct memory access channel of the Fibre Channel adapter for processing the frame when the frame is a command frame and for processing the frame when the frame is a data frame, respectively. In an embodiment, prior to operating in the virtual lane mode, the Fibre Channel adapter may also perform: operating in a normal mode without using the virtual lanes; negotiating with the link peer to operate in the virtual lane mode; and responsive to the negotiating, transitioning from operating in the normal mode to the operating in the virtual lane mode.

Example Embodiments

Figure 1:
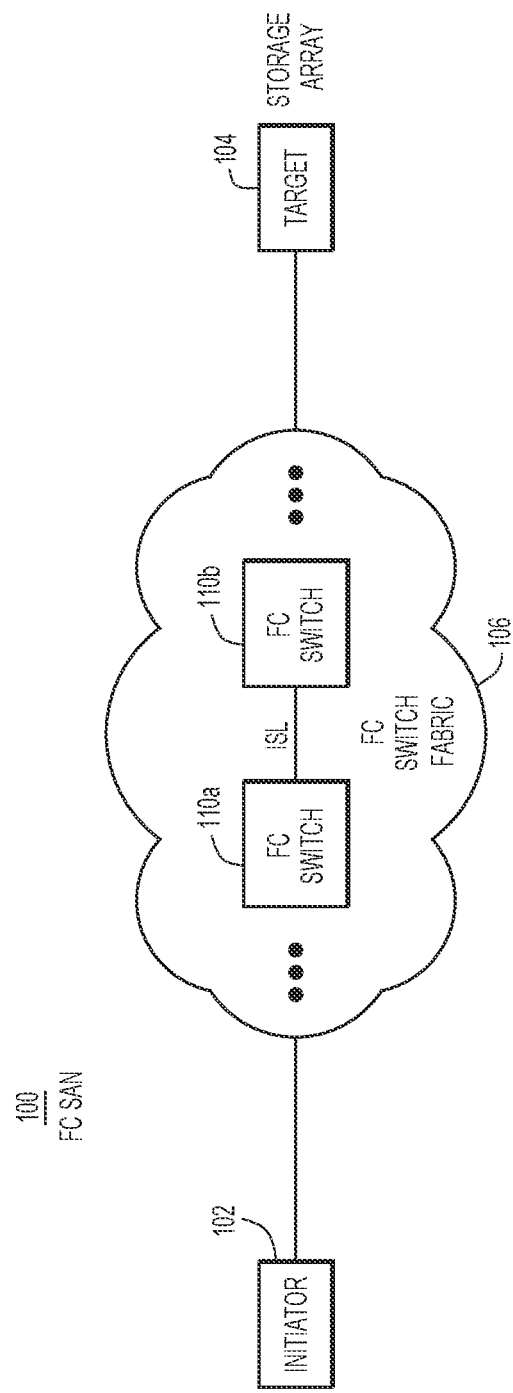
FIG. 1 is a block diagram of a Fibre Channel (FC) storage area network (SAN) FC SAN including an initiator and a target, according to an example embodiment.

With reference to FIG. 1, there is a block diagram of an example FC SAN 100 in which embodiments presented herein may be implemented. FC SAN 100 includes an initiator device 102 (referred to as an initiator 102), a storage array or target device 104 (also referred to as a target 104), and an FC switch fabric 106 (referred to as a switch fabric 106) connected to, and configured to forward traffic between, the initiator and the target. Fabric 106 includes FC switches 110a and 110b (collectively referred to as switches 110) connected to each via an inter-switch link (ISL). Fabric 106 typically includes many more switches than the two shown in the example of FIG. 1. Switches at the edge of switch fabric 106 include switch ports (referred to as FC switch ports or F-Ports) connected to target ports (referred to as N-Ports) of target 104.

As mentioned, switch fabric 106 forwards traffic between initiator 102 and target 104. The traffic may include FC frames (also referred to as "frames") configured according to any known or hereafter developed protocol, such as the FC Protocol (FCP) used to transport Small Computer System Interface (SCSI) protocol constructs, for example. The frames may include a command (CMD) frame (also referred to as a CMD Information Unit (CMD_IU)) and a data frame (also referred to as a Data_IU frame). The CMD_IU frame may include a read command frame (also referred to as a Read Input/Output (I/O) frame or a Read CMD_IU frame) and a write command frame (also referred to as a Write I/O frame or a Write CMD_IU frame). To perform a Read I/O operation, initiator 102 sends the Read I/O frame to target 104 to solicit data from the target. To perform a Write I/O operation, initiator 102 sends the Write I/O frame to target 104 to write data to the target. The Read I/O operation and the Write I/O operation are described below in connection with FIGS. 2 and 3, respectively.

A conventional or normal mode of operation of switch fabric 106 and target 104 will now be described in connection with FIGS. 2-8. When switch fabric 106 and target 104 are operating as described in connection with FIGS. 2-8, the switch fabric and the target are said to be operating in a "normal mode" or a "normal/R_RDY mode." A disadvantage of operating in the normal mode is that it does not effectively mitigate target port credit stalls. Accordingly, embodiments presented herein improve upon the normal mode to effectively mitigate the target port credit stall. The embodiments are described below in connection with FIGS. 9-14. As will be described in detail, the embodiments use virtual lanes and an Extended R_RDY (ER_RDY) FC primitive) between switch ports and target ports. When switch fabric 106 and target 104 are operating in accordance with the embodiments described in connection with FIG. 9-14, the switch fabric and the target are said to be operating in accordance with a "virtual lane/ER_RDY mode," or simply a "virtual lane mode."

Figure 2:
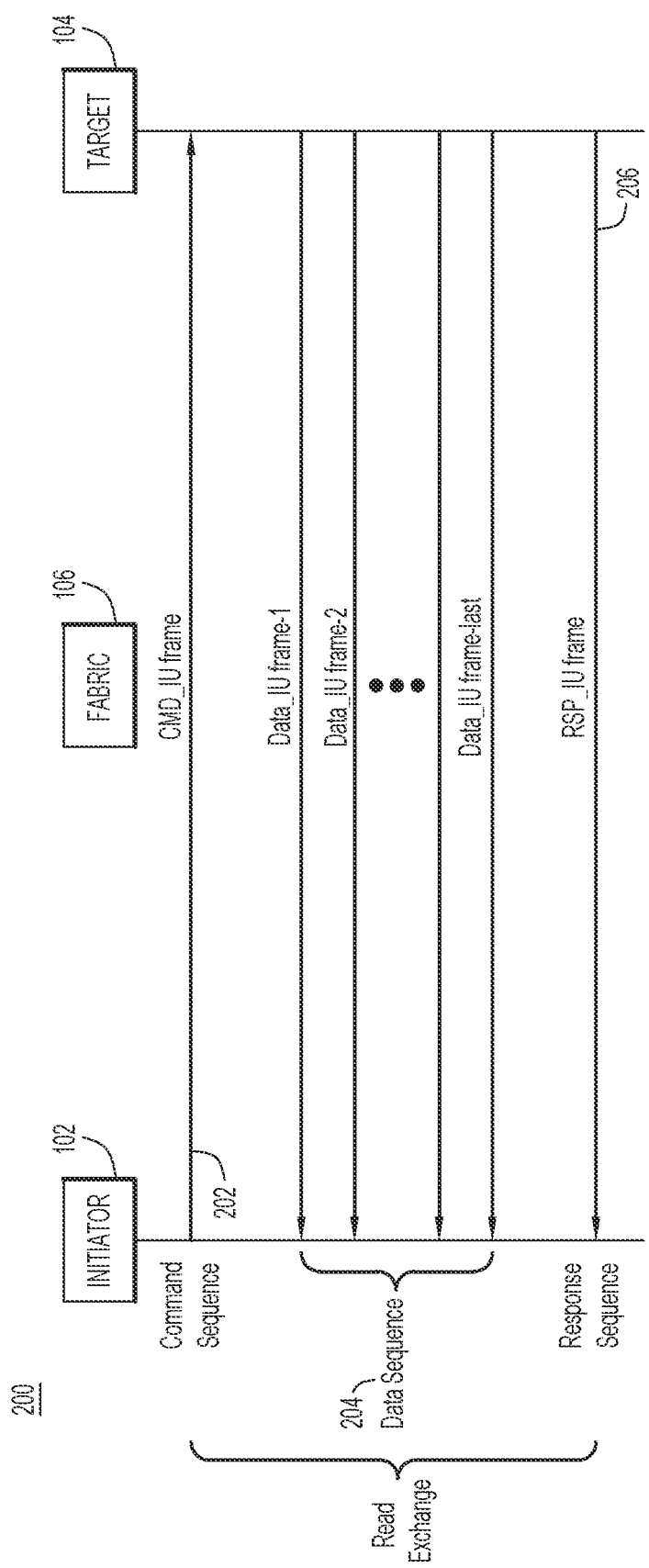
FIG. 2 is a thread diagram of transactions in the FC SAN for a Read (I/O) operation, according to an example embodiment.

With reference to FIG. 2, there is a thread diagram of example transactions 200 in FC SAN 100 for the Read I/O operation. In the example of FIG. 2, switch fabric 106 forwards frames associated with transactions 200 between initiator 102 and a target port of target 104. At 202, initiator 102 sends to target 104 a CMD_IU frame encoded as a Read I/O frame (i.e., a Read CMD_IU frame). In response, at 204, target 104 sends to initiator 102 a sequence of Data_IU frames. Then, at 206, target 104 sends to initiator 102 a response frame (RSP_IU frame).

Figure 3:
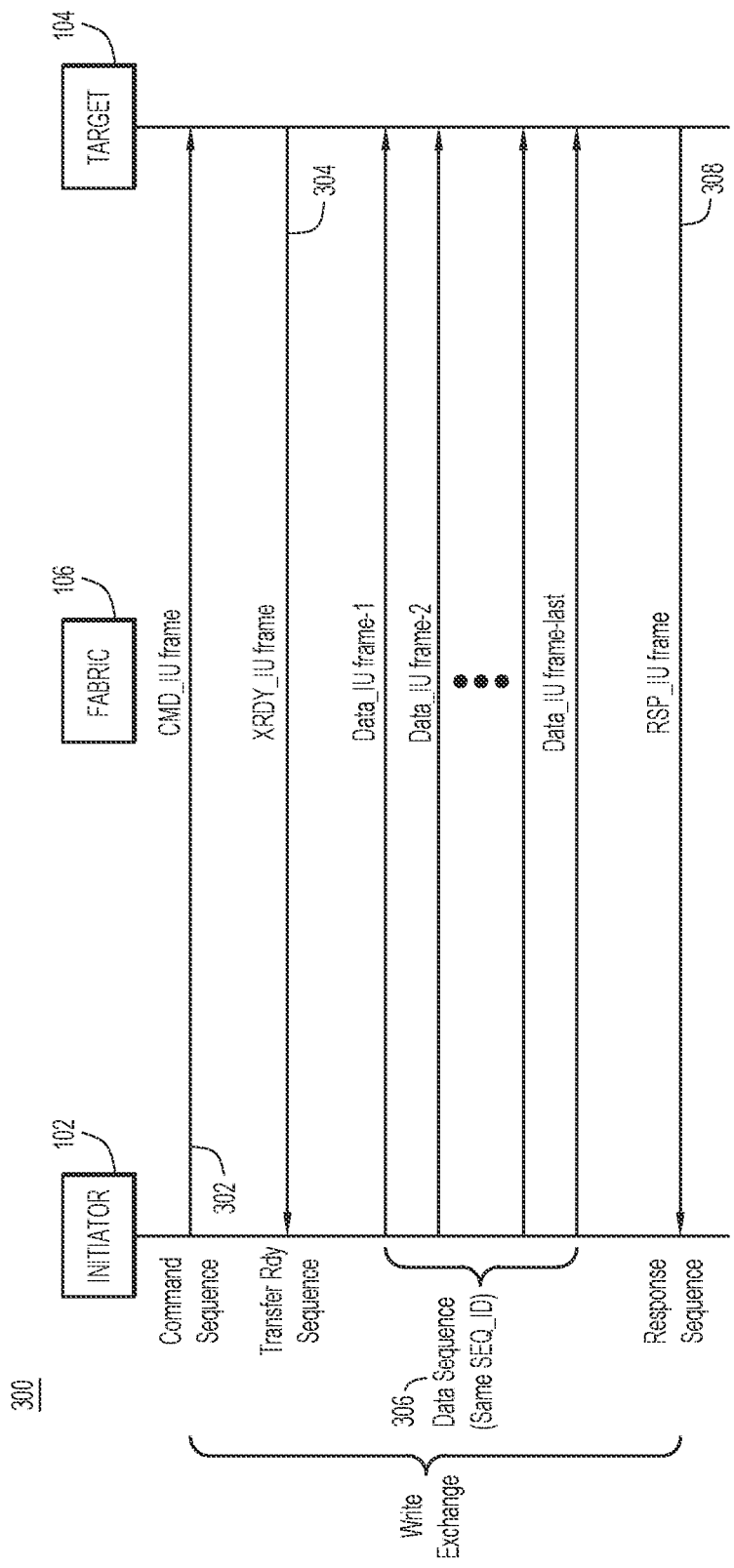
FIG. 3 is a thread diagram of transactions in the FC SAN for a Write (I/O) operation, according to an example embodiment.

With reference to FIG. 3, there is a thread diagram of example transactions 300 in FC SAN 100 for the Write I/O operation. At 302, initiator 102 sends to target 104 a CMD_IU frame encoded as a Write I/O frame (i.e., a Write CMD_IU frame). In response, at 304, target 104 sends to initiator 102 a transfer ready frame (XRDY_IU frame or simply XRDY). Upon receiving the XRDY, at 306, initiator 102 sends to target 104 a sequence of Data_IU frames for the Write I/O operation through switch fabric 106. Switch fabric 106 forwards the Data_IU frames to the target port responsive to receiving from the target port buffer-to-buffer (B2B) credits (via R_RDY FC primitive) that indicate that a receive buffer at the target port is available to receive the Data_IU frames. An alternating exchange of B2B credits (R_RDYs) and Data_IU frames implements a flow control mechanism that switch fabric 106 from sending Data_IU frames to the target port when the receive buffer at the target port is not available to receive and buffer the Data_IU frames. At 308, target 104 sends to initiator 102 a RSP_IU.

In the ensuing description, the descriptor "frame" may be dropped when referring to IUs. For example, "Data_IU frame" and "CMD_IU frame" may be referred to simply as "Data_IU" and "CMD_IU," respectively.

Figure 4:
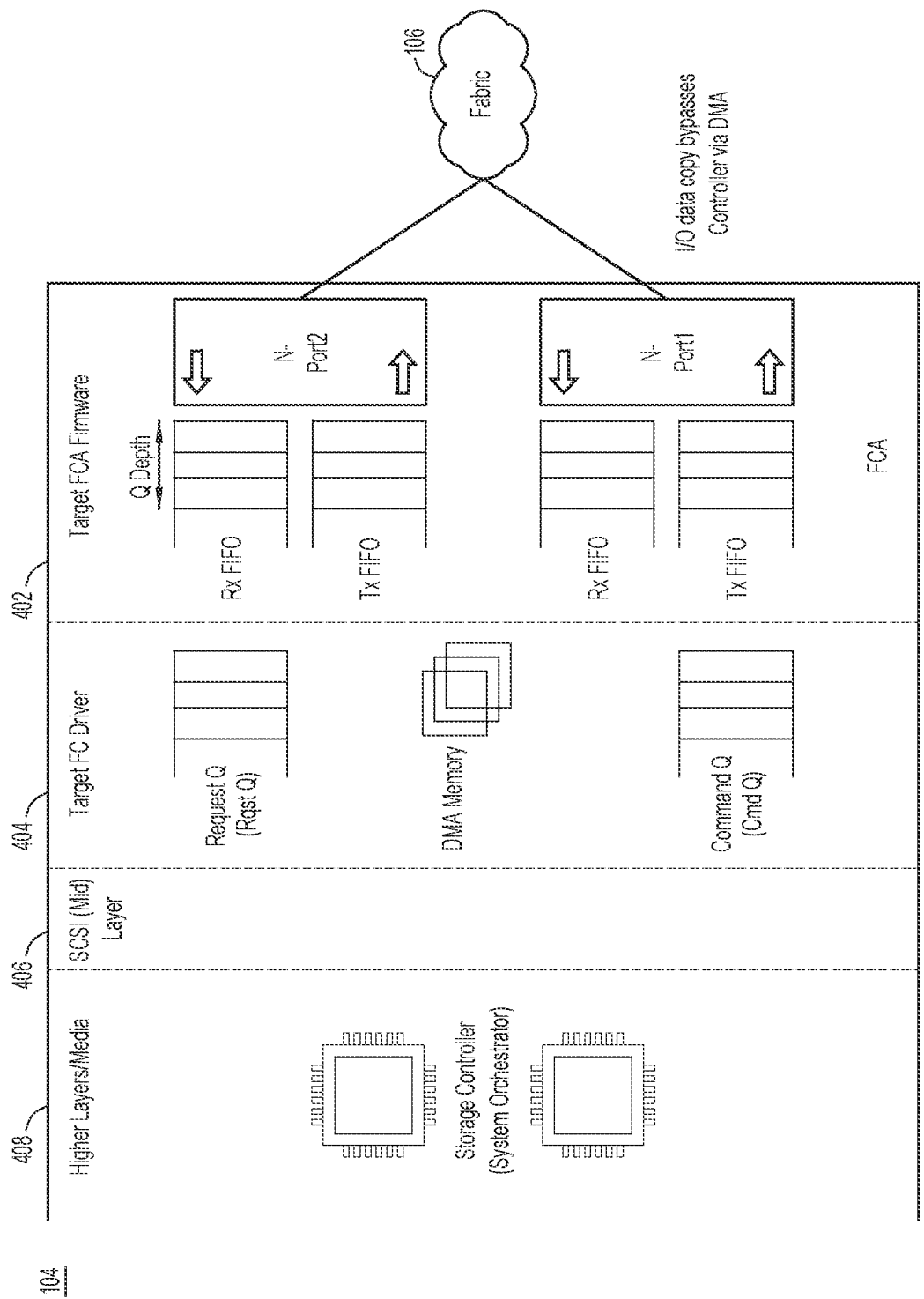
FIG. 4 is an illustration of an architecture of the target, according to an example embodiment.

With reference to FIG. 4, there is an illustration of a typical architecture of target 104. Target 104 includes a switch fabric-facing Target Adapter 402 (referred to as an FC adapter (FCA) 402), an FC driver 404 that communicates with the FC adapter, an SCSI (mid) layer 406 that communicates with the FC driver, and a storage controller 408 (also referred to simply as controller 408) that hosts a target operating system (OS) to provide overall control of the target. FC adapter 402 includes one or more target ports (e.g., N-Port1 and N-Port-2) configured to connect to and communicate with corresponding fabric switch ports (e.g., F-Ports), and FC adapter firmware to control the FC adapter. The FC adapter firmware includes, for each target port, registers, buffers, a receive (Rx) First-In-First-Out (FIFO) coupled to the target port and configured to receive frames from the target port, and a transmit (Tx) FIFO coupled to the target port and configured to transmit frames to the target port. A FIFO represents, more generally, a buffer for storing and processing frames on a first come first serve basis. Accordingly, the FIFOs may be referred to herein, generally, as buffers. FC driver 404 includes an interface FCP to interface with the OS of controller 408, an interrupt handler, a command queue (Command Q or Cmd Q), a request queue (Request Q or Rqst Q), and Direct Memory Access (DMA) memory (or a direct channel to DMA memory). SCSI layer 406 includes a transport independent storage protocol handler to interface between FC driver 404 and controller 408.

Figure 5:
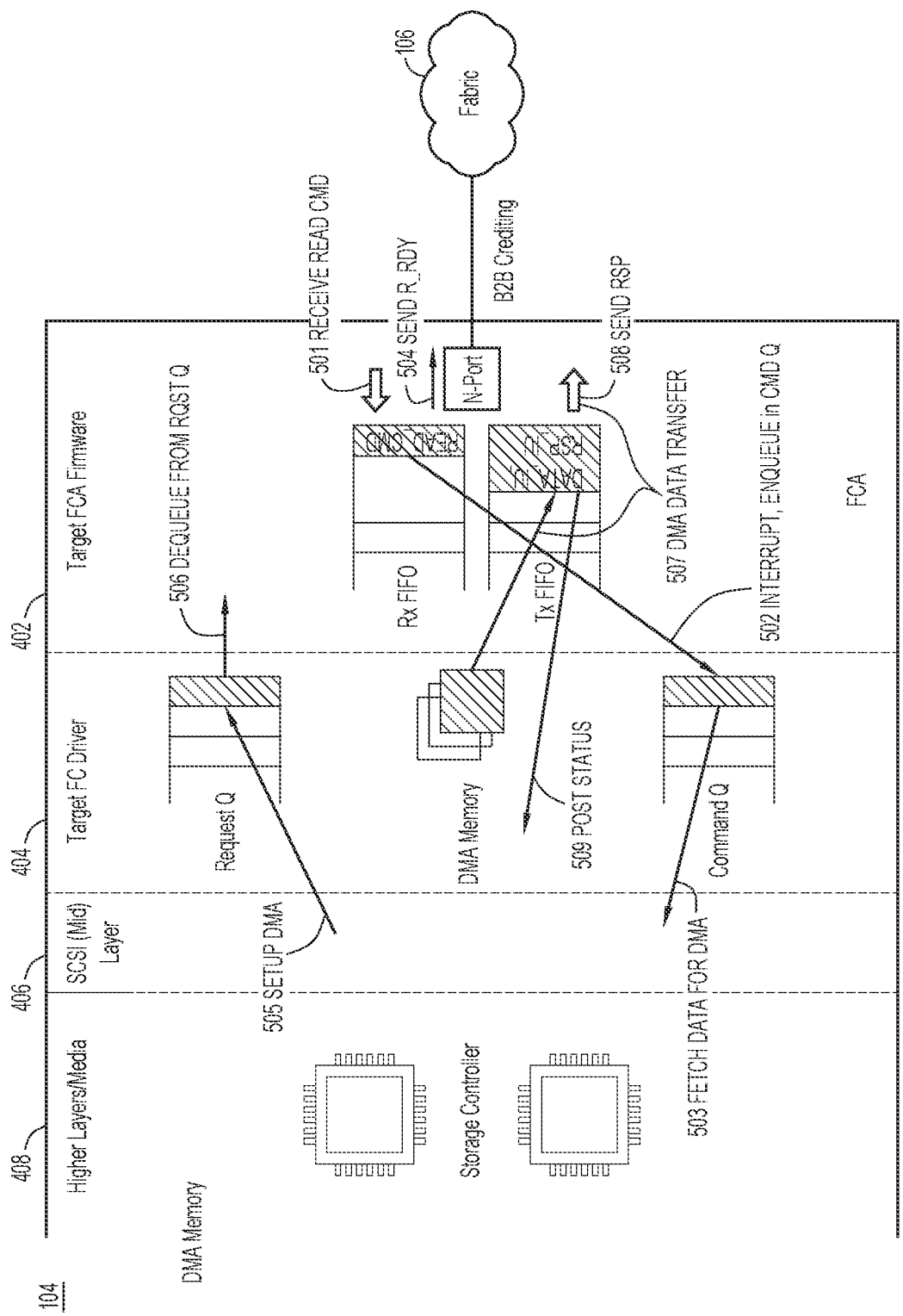
FIG. 5 is an illustration of target processing for a Read I/O operation, according to an example embodiment.

With reference to FIG. 5, there is an illustration of target processing for a Read I/O operation performed on target 104. In the example of FIG. 5, only one target port (e.g., N-Port) is shown. At 501, FC adapter 402 receives a Read CMD_IU from initiator 102 through the target port. FC adapter 402 parses the Read CMD_IU, and stores the Read CMD_IU in the Rx FIFO. At 502, FC adapter 402 interrupts FC driver 404 and, in response, the FC driver enqueues the Read CMD_IU (from the Rx FIFO) into the Command Q of the FC driver. This removes the Read CMD_IU from the Rx FIFO, leaving it with availability/space for a subsequent command frame. At 503, SCSI layer 406 services the Read CMD_IU in the Command Q by finding the data to be read in a read-cache/storage media and then fetching the data. At 504, FC adapter 402 returns to a switch port of fabric switch 1096 a B2B credit (i.e., R_RDY) for the frame. At 505, FC driver 404 establishes a DMA channel for the data, and stores data descriptors (e.g., an address and a length of the data) for the DMA channel into the Request Q of the FC driver. At 506, FC adapter 402 dequeues the data descriptors from the Request Q. At 507, FC adapter 402 uses the data descriptors for a DMA operation that transfers data from the DMA memory, and packs the data into the Tx FIFO as Data_IUs. The target port transmits the Data_IUs from the Tx FIFO to initiator 102. At 508, when all of the Data_IU frames have been transmitted, FC adapter 402 sends a response frame (RSP_IU) to initiator 102 and, at 509, posts the response status to FC driver 404 to indicate completion of the Read I/O operation, and freeing DMA resources.

Figure 6:
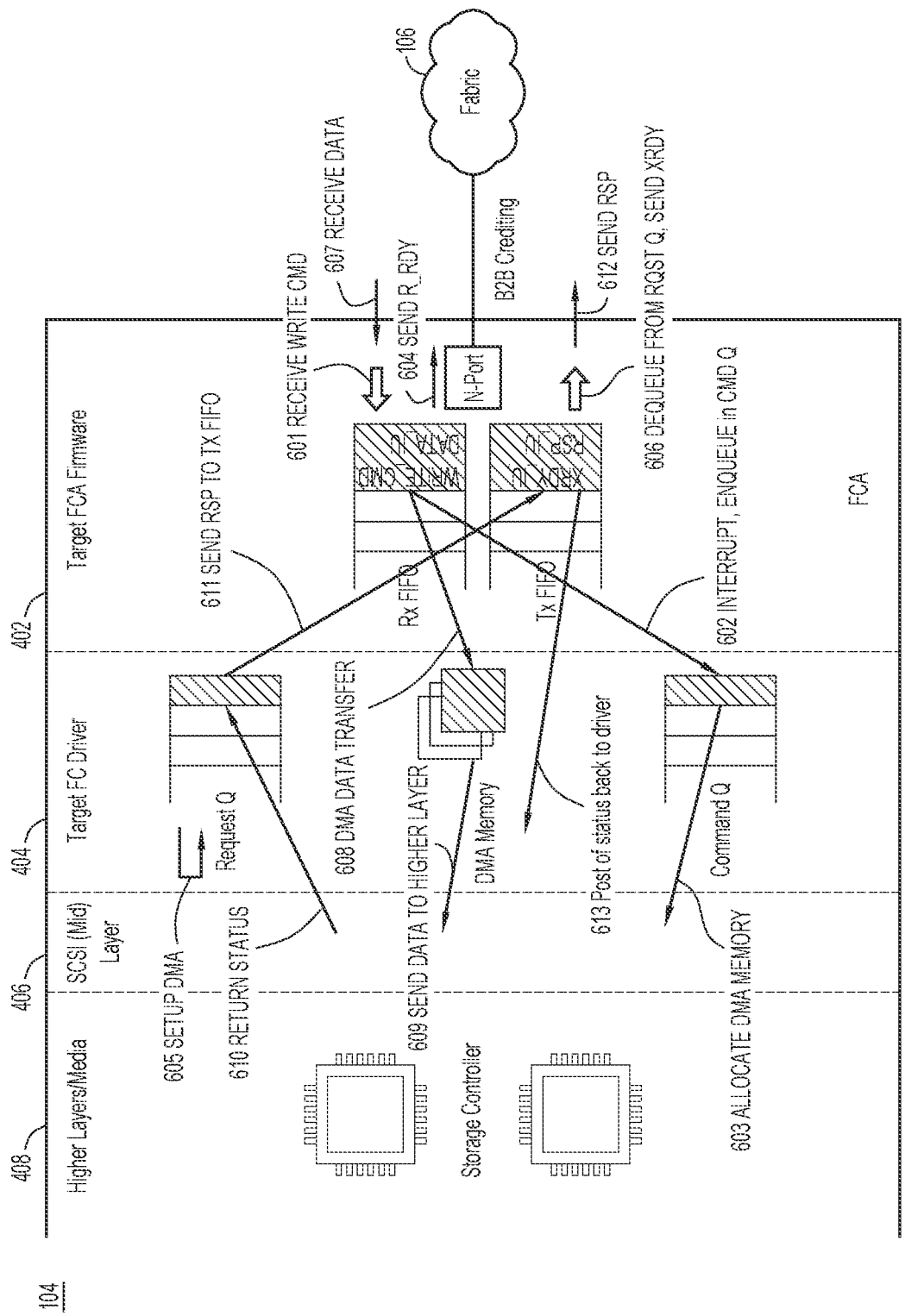
FIG. 6 is an illustration of target processing for a Write I/O operation, according to an example embodiment.

With reference to FIG. 6, there is an illustration of target processing for a Write I/O operation performed on target 104. Processing for the Write I/O is generally similar to that for the Read I/O operation, except for transmission of a ready (XRDY_IU) from target 104 to initiator 102, as is now described. At 601, FC adapter 402 receives a Write CMD_IU from initiator 102 through the target port. FC adapter 402 parses the Write CMD_IU, and stores it in the Tx FIFO. At 602, FC adapter 402 interrupts FC driver 404 and, in response, the FC driver enqueues the Write CMD_IU (from the Tx FIFO) into the Command Q of the FC driver. This removes the Write CMD_IU from the Tx FIFO. At 603, SCSI layer 406 services the Write CMD_IU in the Command Q by allocating DMA memory for a size of data associated with the Write I/O operation. At 604, FC adapter 402 returns to a switch port of switch fabric 106 a B2B credit (i.e., R_RDY) for the frame.

At 605, FC driver 404 establishes a DMA channel to allocate DMA memory for the data, and stores data descriptors for the DMA channel into the Request Q of the FC driver. At 606, FC adapter 402 dequeues the data descriptors from the Request Q and, sends XRDY to initiator 102 to indicate that the DMA buffers are ready. At 607, FC adapter 402 receives a Data_IU from initiator 102 and stores the Data_IU to the Rx FIFO. At 608, the Data_IU is transferred via a DMA operation to the pre-allocated DMA memory. This frees space in the Rx FIFO, and FC adapter 402 sends a B2B credit (R_RDY) (not shown in FIG. 6) to the switch port. At 609, SCSI layer 406 passes the data from the DMA memory to higher layers of target 104. At 610, SCSI layer 406 forwards status to FC driver 404. At 611, FC driver 404 packs the status into the Tx FIFO as a response frame (RSP_IU) to be sent to initiator 102. At 612, the target port transmits the RSP_IU to initiator 102, and frees DMA resources. At 613, status is posted.

The various buffers resident in target 104 as described above, including at least some of the Rx FIFOs, the Tx FIFOs, the Request Q, and the Command Q, have respectively configurable queue depths. This permits an administrator to tune the queue depths based on a number of initiators to which the target port is zoned and queue depths of corresponding initiator-side buffers. Usually, the target port is oversubscribed by design because it is probabilistically rare for all initiators to access Logical Unit Numbers (LUNs) associated with the target port, concurrently.

Figure 7:
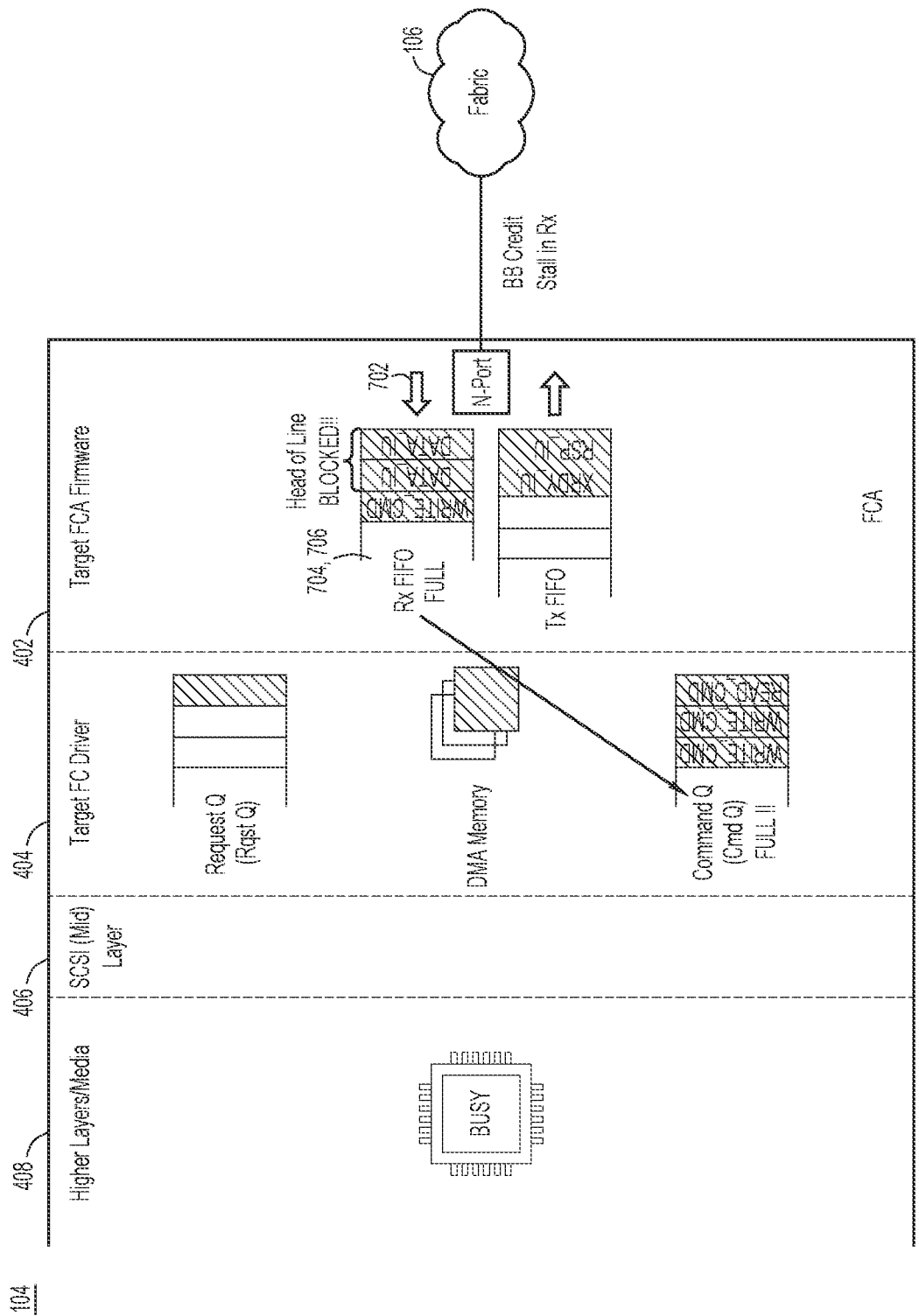
FIG. 7 is an illustration of a credit stall at a target port of the target of FIG. 4, according to an example embodiment.

With reference to FIG. 7, there is an illustration of an example credit stall at the target port of the target of FIG. 4. Target storage controller 408 orchestrates multiple tasks, such as servicing of I/O operations, media management, and value added data services, for example. All of these operations can be computationally intensive and may keep the controller busy. While controller 408 is too busy, or too low on memory, to process CMD_IUs in the manner described above, at 702, the target port receives a bursts or flood of CMD_IUs to be processed by target 104. The busy status of controller 408 slows down dequeuing of CMD_IUs from the Command Q that are waiting to be serviced by the controller. When this condition persists, at 704, the CMD_IUs in the Command Q build-up to a maximum queue depth and cause a queue overrun. Receipt of more CMD_IUs than storage controller 408 is able to dequeue and process causes a backpressure onto the Rx FIFO of FC adapter 402. Eventually, at 706, the Rx FIFO also fills-up and withholds B2B credits (R_RDYs), i.e., becomes credit-stalled, which has a spill-over effect on switch fabric 106 due to its no-drop requirement. That is, the target port credit stall induces credit stall in switch fabric 106. In addition, at 708, a CMD_IU frame waiting at the head of the Rx FIFO blocks all DATA_IU frames of a previous Write I/O operation in the Rx FIFO and that are ready to be processed. This is referred as head-of-line (HoL) blocking. Even further, the target port credit stall holds-up pre-allocated DMA resources. All of the foregoing effects can be detrimental to overall FC SAN performance.

Figure 8:
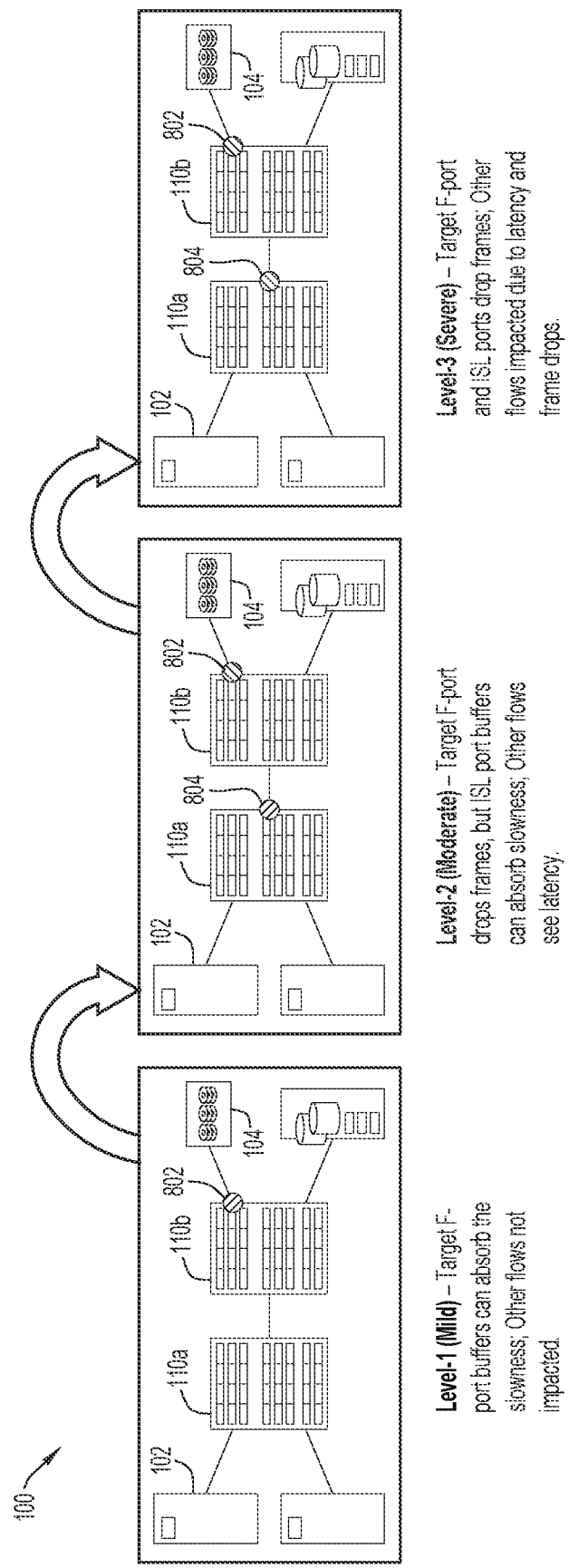
FIG. 8 is an illustration of different levels of congestion in a switch fabric of the FC SAN due to a target port credit stall, according to an example embodiment.

With reference to FIG. 8, there is an illustration of level-1 (mild), level-2 (moderate), and level-3 (severe) switch fabric congestion that can occur in switch fabric 106 due to the target port credit stall. As alluded to above, the credit stall occurs when the target port operates as a "slow drain" target port that withholds the B2B credits for an extended time period. At level-1 (mild) fabric congestion, target connected switch F-port (frame) buffers (indicated generally at 802) can absorb the slowdown, such that other flows are not impacted. At level-2 fabric congestion, the target connected switch F-port buffers 802 drop frames, but ISL port buffers (indicated generally at 804) can absorb slowness, such that other flows experience latency. At level-3 fabric congestion, the target connected F-port buffers 802 and the ISL port buffers 804 drop frame, and other flows are impacted due to latency and frame drops.

Conventional approaches to mitigate target port credit stall are generally ineffective. A first approach automatically recovers a credit-stalled target port by initiating a Link Reset (LR) to replenish all of the B2B credits. Disadvantageously, this is a disruptive operation and the target port credit stall may easily reappear. A second approach simply drops frames on the target port when it is credit-stalled longer than a configurable hold time; however, this drops every frame indiscriminately, and may result in retransmissions that flood the target port. Another approach uses "throttling tools" in the storage array, which are also ineffective. A myriad of other ineffective approaches exist.

Accordingly, embodiments presented herein and described below in connection with FIG. 9-14, provide an effective solution to a credit-stalled target port. At a high-level, the embodiments employ separate virtual lanes for CMD_IUs and Data_IUs in switch fabric 106 and target 104. The embodiments also introduce an Extended R_RDY (ER_RDY) to return B2B credits on a per-virtual lane basis. These and other features of the embodiments are described in detail below.

As is known, the R_RDY protocol command (referred to simply as R_RDY) is a flow control mechanism in the FC SAN that is sent to a link peer buffer to indicate availability (e.g., B2B credit) for a subsequent receive frame. R_RDY is sent when a frame is received, but then its buffer freed. Conventionally, R_RDY only carries information to indicate that a new max size frame buffer is now available. Embodiments presented herein define/employ the ER_RDY mechanism that extends the R_RDY mechanism to also encode virtual lane information so that different classes of traffic (i.e., different types of frames) can be subjected to flow control independently over a physical link. The ER_RDY may be configured similarly to the R_RDY, except that the ER_RDY includes one or more fields populated with information (e.g., VL number) that indicates/identifies a particular virtual lane, as described below.

In various embodiments, switch fabric 106 and target 104 may negotiate with each other to enter into the virtual lane/ER_RDY mode (also referred to simply as the "virtual lane mode"), concurrently. This may occur when target ports login to switch fabric 106, e.g., at switch fabric login (FLOGI). Alternatively, switch fabric 106 and the target port of FC adapter 402 may transition from operating in the normal mode to operating in the virtual lane/ER_RDY mode responsive to a target port credit stall being detected, as described below.

Figure 9:
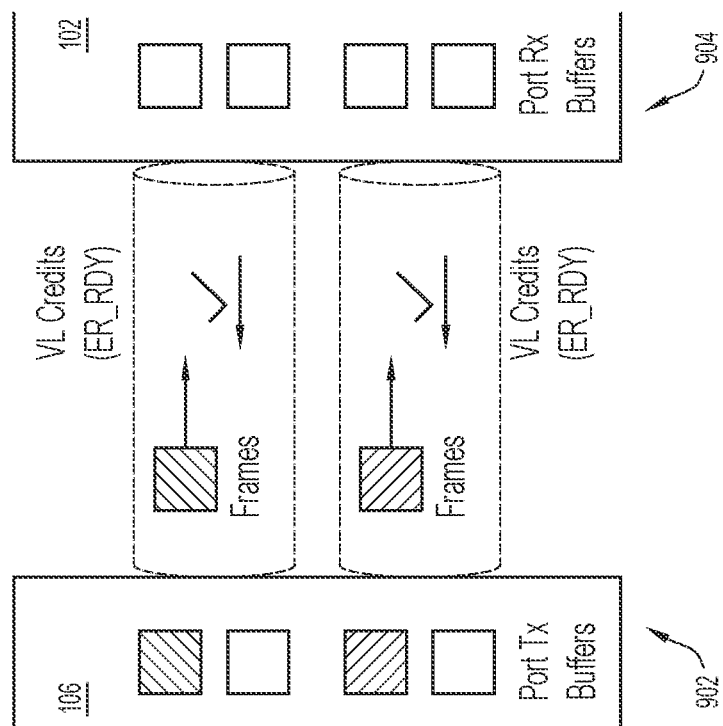
FIG. 9 is an illustration of using virtual lanes and an Extended R_RDY (ER_RDY) FC primitive between a switch port of the switch fabric and a target port of the target, according to an example embodiment.

With reference to FIG. 9, there is an illustration of a high-level example of using virtual lanes (VLs) and ER_RDY between Tx Buffers 902 associated with a switch port (e.g., F-Port) of switch fabric 106 and Rx Buffers 904 associated with a target port (e.g., N-Port) of target 104. The example of FIG. 9 shows partitioning of Tx Buffers 902 and Rx Buffers 904 into 2 VLs with independent crediting for each virtual lane (VL). That is, ER_RDY is used for B2B crediting on a per-VL bases (i.e., at a granularity of a VL) with the compatible/connected link partner. Fabric 106 and target FCA 104 both support/implement the VLs and use of ER_RDY as a flow control mechanism to avoid target port credit stall.

Figure 10:
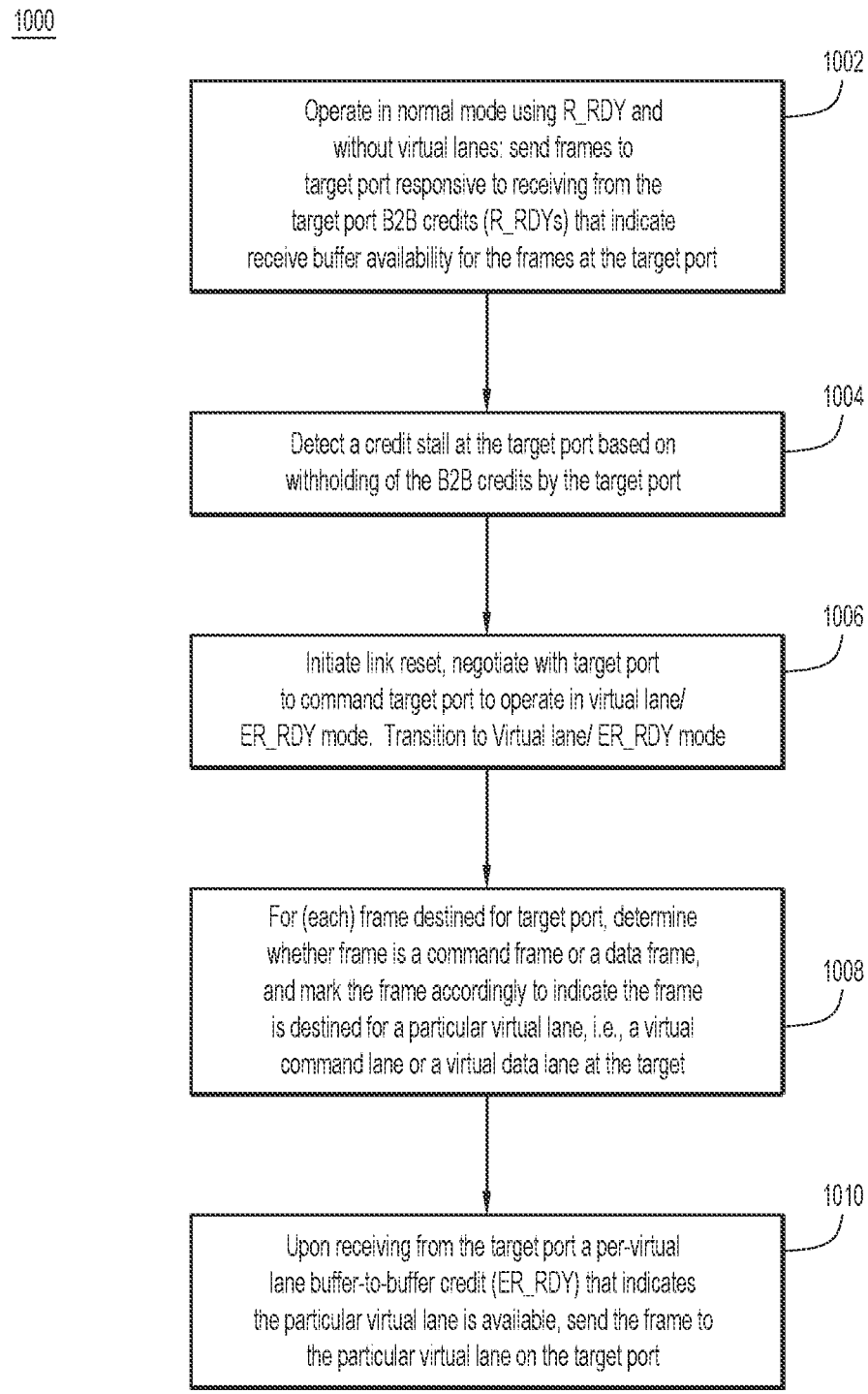
FIG. 10 is a method of operating in a virtual lane/ER_RDY mode at the switch fabric, according to an example embodiment.

With reference to FIG. 10, there is an example method 1000 performed by switch fabric 106 (e.g., by FC switch 110a or 110b) to implement the VL/ER_RDY mode, according to embodiments presented herein. Method 1000 corresponds to method 1100 performed by target 104 according to embodiments presented herein, and described below in connection with FIG. 11. It is generally assumed that throughout method 1000, switch fabric 106 receives frames destined for a target port of target 104 from initiator 102, and attempts to send the frames from a switch port of the switch fabric to the target port over a link connecting the two ports.

At 1002, the switch port and the target port, and their associated/controlling port logic, operate by default in the normal mode (i.e., the normal/R_RDY mode) without VLs, as described above in connection with FIGS. 2-8, for example. Thus, switch fabric 106 sends frames from the switch port to the target port responsive to receiving from the target port R_RDYs (i.e., B2B credits) that indicate receive buffer availability for the frames at the target port.

At 1004, switch fabric 106 detects a credit stall at the target port based on withholding of the B2B credits by the target port. For example, switch fabric 106 may employ slow drain counters to detect that a time spent waiting (txWait) with zero credits exceeds a predetermined wait time indicative of the credit stall.

At 1006, upon detecting the credit stall, switch fabric 106 initiates a link reset toward the target port. As part of the link reset, or following the link reset, switch fabric 106 negotiates with target 104 (more specifically, with FC adapter 402 on which the target port is hosted) to command the target (e.g., the FC adapter) to operate in the VL/ER_RDY mode to support VLs and ER_RDYs. This may be done as part of port login using proprietary fields in extended FLOGI and FLOGI ACC procedure where the ability to operate in the VL/ER_RDY mode including number of VLs and credits for each VL are negotiated between the switch port and FC adapter 402/target port.

The VLs include a command lane VL1 for CMD_IUs and a data lane VL0 for non-command IUs (e.g., Data_IUs). As a result, switch fabric 106 and target 104 (more specifically, FC adapter 402) both transition from operating in the normal/R_RDY mode to operating in the VL/ER_RDY mode at their respective ends of the link.

Next operations 1008 and 1010 are performed while operating in the VL/ER_RDY mode.

At 1008, for each frame received from initiator 102 and that is destined for the target port, switch fabric 106 determines whether the frame is a command frame (CMD_IU) or a data frame (Data_IU). This represents a classification of the frame by type, as either a command frame or a non-command/data frame. Based on results of the determining/classification, switch fabric 106 marks the frame with a VL identifier to indicate that the frame is destined for a particular VL among the VLs. For example, when the frame is a command frame (i.e., a CMD_IU), switch fabric 106 marks the frame with virtual command lane identifier VL1 to indicate the frame is destined for the virtual command lane. When the frame is a non-command frame (e.g., a Data_IU), switch fabric 106 marks the frame with virtual data lane identifier VL0 to indicate the frame is destined for the virtual data lane.

The above-mentioned determining and marking operations may be implemented in switch fabric 106 using one or more access control lists (ACLs) in combination with other switch fabric logic. For example, an ACL installed on an ingress switch port (e.g., E-port) of switch fabric 106 may classify and mark each frame received (from initiator 102) at the ingress port and that is destined for the target port. The ACL may perform a lookup on a field FCHDR.RCTL of an FC header of each frame. The ACL result encodes VL information into the FCHDR.CS_CTL field of the frame, before switch fabric 106 sends the frame toward FC adapter 402. For example, if the frame is an I/O CMD_IU having FCHDR.RCTL=0x6, or if the frame is a non-I/O FC command having a different FCHDR.RCTL value, the frame is encoded/marked with a value for VL=1 to indicate virtual command lane VL1 because the frame is to be processed by the Command Q of target 104. If the frame is a Data_IU having FCHDR.RCTL=0x1, the frame is encoded/marked with a value for VL=0 to indicate virtual data lane VL=0.

Next operations 1010 and 1012 are performed while operating in the VL/ER_RDY mode.

At 1010, upon receiving from the target port a per-VL B2B credit (ER_RDY) that indicates the particular VL determined and marked at 1008 is available (i.e., that indicates availability for VL1 or VL0) for a subsequent frame (i.e., a subsequent command frame or data frame), switch fabric 106 sends the frame from the switch port to the target port.

Figure 11:
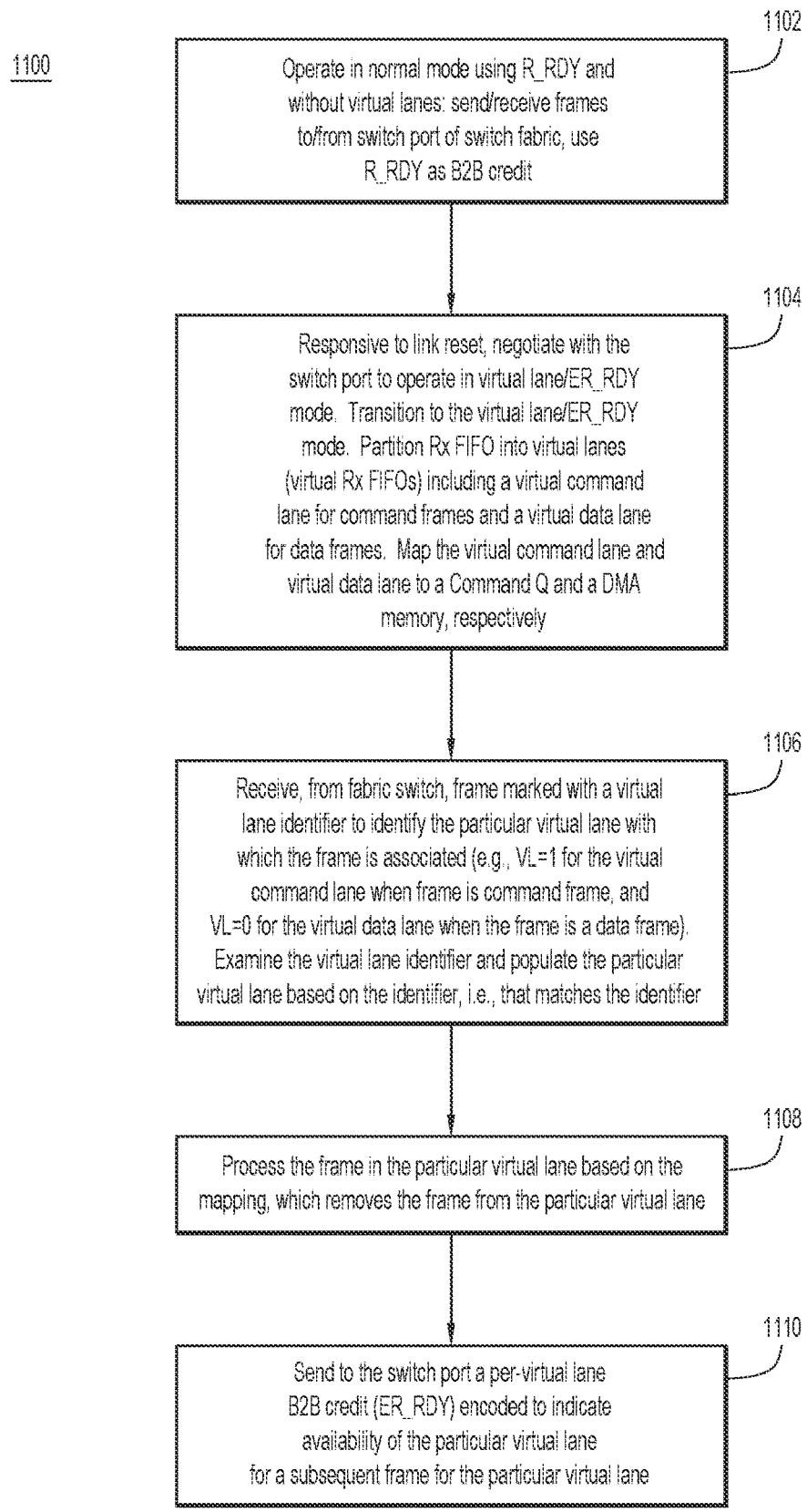
FIG. 11 is a method of operating in the virtual lane/ER_RDY mode at the target, according to an example embodiment.

With reference to FIG. 11, there is an example method 1100 performed by target 104 to implement the VL/ER_RDY mode, according to embodiments presented herein. Method 1100 is performed primarily in FC adapter 402 and SCSI layer 406. Method 1100 assumes a target port hosted on FC adapter 402 is connected to a switch port of switch fabric 106 over a link, and that the switch port is repeatedly sending frames to the target port. Method 1100 assumes that FC adapter 402 is VL/ER_RDY capable, meaning that it is able to operate in the VL/ER_RDY mode when commanded to do so.

At 1102, FC adapter 402 and the target port operate by default in the normal/R_RDY mode, as described above in connection with FIGS. 4 and 5, for example. In the normal/R_RDY mode, the Rx Buffer of FC adapter 402 is not partitioned into VLs, and the FC adapter transmits R_RDYs, not ER_RDYs.

At 1104, FC adapter 402 responds to a link reset initiated from the switch port after a credit stall event triggers a Link Reset. Also, following the link reset, initiates a negotiation with FC adapter 402 to operate in the VL/ER_RDY mode, and the FC adapter responds by accepting to operate in the VL/ER_RDY mode. As a result, FC adapter 402 transitions from operating in the normal/R_RDY mode to the VL/ER_RDY mode. FC adapter 402 partitions the Rx Buffer into separate VLs including a virtual command lane VL1 to buffer command frames (CMD_IUs) received from the switch port through the target port and a virtual data lane VL0 to buffer non-command frames (Data_IUs) received from the switch port through the target port. That is, FC adapter 402 partitions the Rx FIFO into a CMD Rx FIFO for VL1 to buffer the CMD_IUs and a Data Rx FIFO for VL0 to buffer the Data_IUs. FC adapter 402 also maps or binds the virtual command lane to the Command Q for processing the CMD_IUs and the virtual data lane to the DMA memory/channel for processing the Data_IUs. Such mapping may be implemented using address pointers, for example.

Next operations 1106 and 1108 are performed in the VL/ER_RDY mode.

At 1106, the target port receives a frame from the switch port. The frame may be a command frame (CMD_IU) or a non-command frame (Data_IU). FC adapter 402 examines the VL field (e.g., FCHDR.CS_CTL) in the frame header, which is marked with VL=1 to indicate virtual command lane VL1 when the frame is a command frame (CMD_IU), or with VL=to indicate virtual data lane VL0 when the frame is a non-command frame (Data_IU). FC adapter 402 populates one of the VLs (i.e., either the CMD Rx FIFO for VL1 or the Data Rx FIFO for VL0) with the frame based on the way the VL field is marked. For example, when the VL field is marked with VL=1, FC adapter 402 populates the CMD Rx FIFO for VL1 with the command frame. On the other hand, when the VL field is marked with VL=0, FC adapter 402 populates the Data Rx FIFO for VL0 with the data frame.

At 1108, target 104 processes the frame from the VL (i.e., the CMD Rx FIFO for VL1 or the Data Rx FIFO for VL0) into which the frame was stored in accordance with the CMD Rx FIFO→Command Q and Data Rx FIFO→DMA memory mapping established at 1104, which removes the frame from the VL. For example, when the frame is a Data_IU, the processing includes transferring the frame from the virtual data lane VL0 (i.e., from the Data Rx FIFO for VL0) to DMA memory, in the manner described above. When the frame is a CMD_IU, the processing includes dequeuing the frame from the virtual command lane VL1 (i.e., from the CMD Rx FIFO for VL1) and enqueing the frame into the Command Q, for subsequent processing by higher layers, as described above. Assuming the CMD Rx FIFO for VL1 and the Data Rx FIFO for VL0 are each populated with at least one unprocessed IU, FC adapter 402 may schedule handling/processing of their respective IUs via a simple round-robin scheme on a per exchange basis, e.g., all DATA_IUs of an exchange are dequeued in one shot from the Data Rx FIFO for VL0 for every CMD_IU dequeued from the CMD Rx FIFO for VL1. With the Write CMD_IU and its corresponding Data_IUs populating different VLs, out-of-order frame delivery is not possible since the Data_IUs are always solicited via XRDY after processing of the Write CMD_IU.

After the processing of 1108, at 1110, FC adapter 402 encodes ER_RDY to indicate the VL (e.g., either the Data Rx FIFO for VL0 or the CMD Rx FIFO for VL1) from which the frame was processed at 1108 and that is now available to receive a subsequent frame (e.g., data frame or command frame, depending on the indication). The target port transmits the ER_RDY to the switch port to indicate the availability of the VL. That is, the ER_RDY includes an indication of which of the VLs is now available due to the processing of 1108. Upon receiving the ER_RDY, the switch port can send the next pending frame based on the indication in the VL indication ER_RDY.

In practice, a majority of Write I/O operation sizes are in the 4K-8K bytes range. Assuming an FC-Maximum Transmission Unit (MTU) (FC-MTU) at 2K bytes, then every Write CMD_IU on average includes approximately 4 Data_IUs, i.e., the CMD_IU:DATA_IU ratio is 1:4. Accordingly, in one example, in FC adapter 402, the initially undivided Rx FIFO is partitioned between the Data Rx FIFO for VL0 and the CMD Rx FIFO for VL1 in an 80:20 size ratio. Similarly, corresponding switch port buffers in switch fabric 106 may be partitioned with the 80:20 size ratio. Such partitioning ensures that at any given time, the number of CMD_IUs outstanding does not exceed 20% of the Command Q of FC driver 404 per port, which virtually eliminates the possibility of the Command Q becoming full. This also has a smoothening effect on a burst of Write CMD_IUs that are received at Command Q by absorbing the burst in the CMD Rx FIFO for VL1 at the target port.

An advantage of the independent VLs is that when storage controller 408 is busy, while the dequeuing of the CMD Rx FIFO for VL1 is stopped, the DMA transfers of Data_IUs for previously processed Write CMD_IUs stored in the Data Rx FIFO for VL0 continue without controller involvement. All the Data_IU frames belonging to a single exchange are dequeued in one shot from the Data Rx FIFO for VL0 because their dequeuing is part of a single DMA operation. This way Data_IU processing successfully completes without involving storage controller 408 and HoL blocking of Data_IUs is eliminated. Also, limiting the number of outstanding CMD_IUs provides storage controller 408 with "breathing space" once it starts processing the Command Q to dispatch current tasks. The ability to absorb a burst of CMD_IUs when storage controller 408 is no longer busy shifts toward switch fabric 106 due to a relatively shallow CMD Rx FIFO for VL1, but this is deemed acceptable given the no-drop nature of the switch fabric. The net effect is to significantly improve the performance of FC SAN 100.

In addition to the features described above, switch fabric 106 and/or FC adapter 402 may implement other features to avoid undesired stalls and HoL blocking, including existing frame timeout techniques with/without sending of a Busy status. An existing frame timeout may be employed more aggressively on VL1 to ensure that a flood of CMD_IUs on the Command Q is eliminated. More generally, the existing techniques per-physical switch port are now employed on a per-VL basis when combined with the embodiments presented herein.

Figure 12:
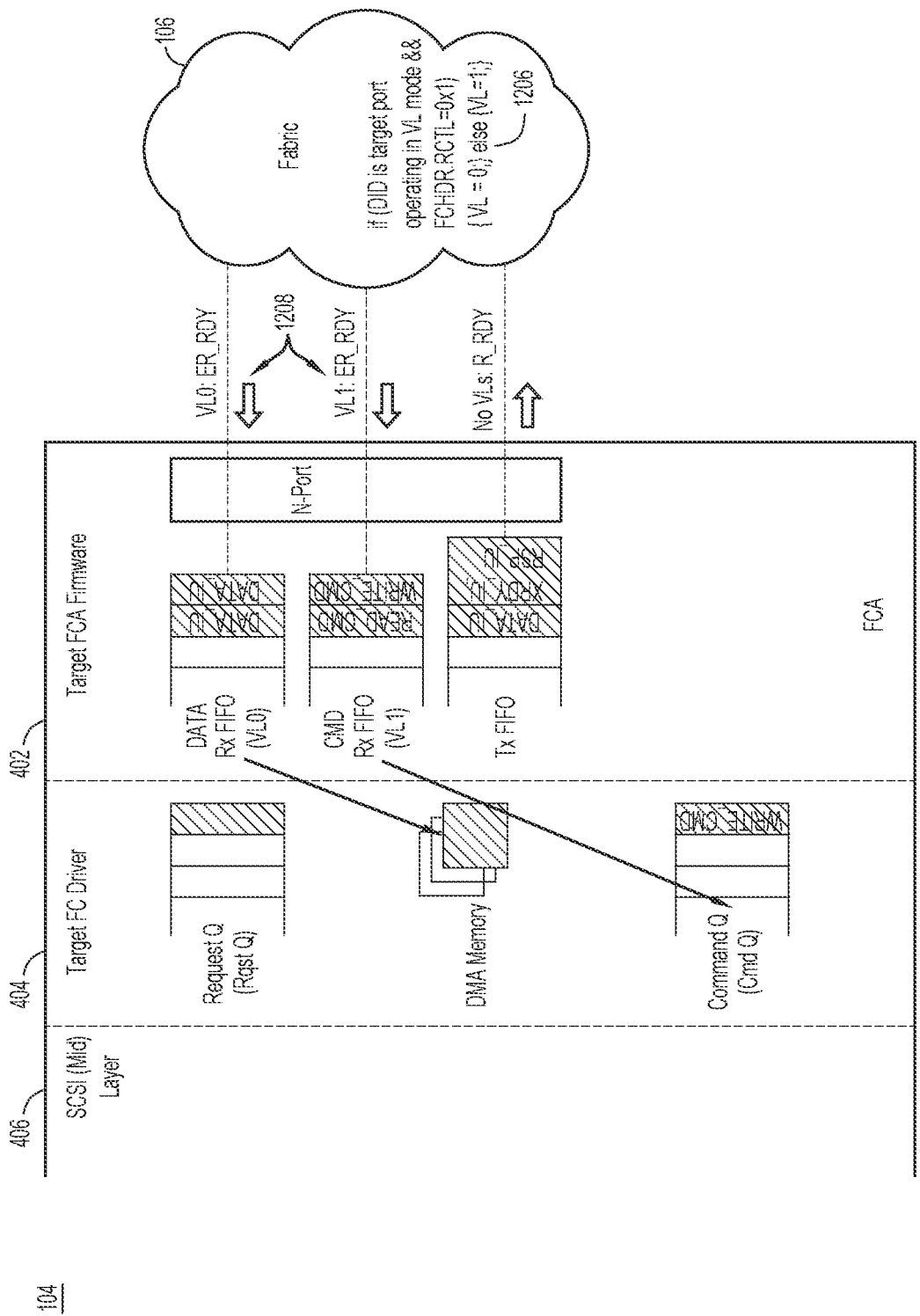
FIG. 12 shows the use of virtual lanes and ER_RDY to solve target buffer credit stalls, according to an example embodiment.

With reference to FIG. 12, there is an illustration that shows the use of VLs and ER_RDY according to the embodiments presented herein to solve target buffer credit stalls. In the example of FIG. 12, both target 104 and switch fabric 106 are operating in the VL/ER_RDY mode that supports VLs including virtual command lane V1 and virtual data lane V0. Thus, FC adapter 402 of target 104 has partitioned Rx FIFO into a CMD Rx FIFO for VL1 and a Data Rx FIFO for VL0. At 1206, switch fabric 106 marks frames to be transmitted toward the target port with VL identifiers based on frame type. That is, switch fabric 106 marks a command frame with the virtual command lane identifier VL1, and a data frame with the virtual data lane identifier VL0. At 1208, switch fabric 106 transmits the marked frames to the target port responsive to receipt of ER_RDYs indicating availability of the partitioned Rx FIFOs (e.g., the CMD Rx FIFO for VL1 or the Data Rx FIFO for VL0) for the VLs for which the marked frames are identified/destined.

In one scenario, there is no stall in the virtual data lane VL0 because there is available DMA memory. This avoids HoL in the Data Rx FIFO. In another scenario, virtual command lane VL1 stalls; however, a short VL1 hold time with BSY/Drop of CMD_IUs restricts incoming Data_IUs and prevents stall of the Command Q. Note that VLs in the FC adapter transmit direction are unnecessary.

Figure 13:
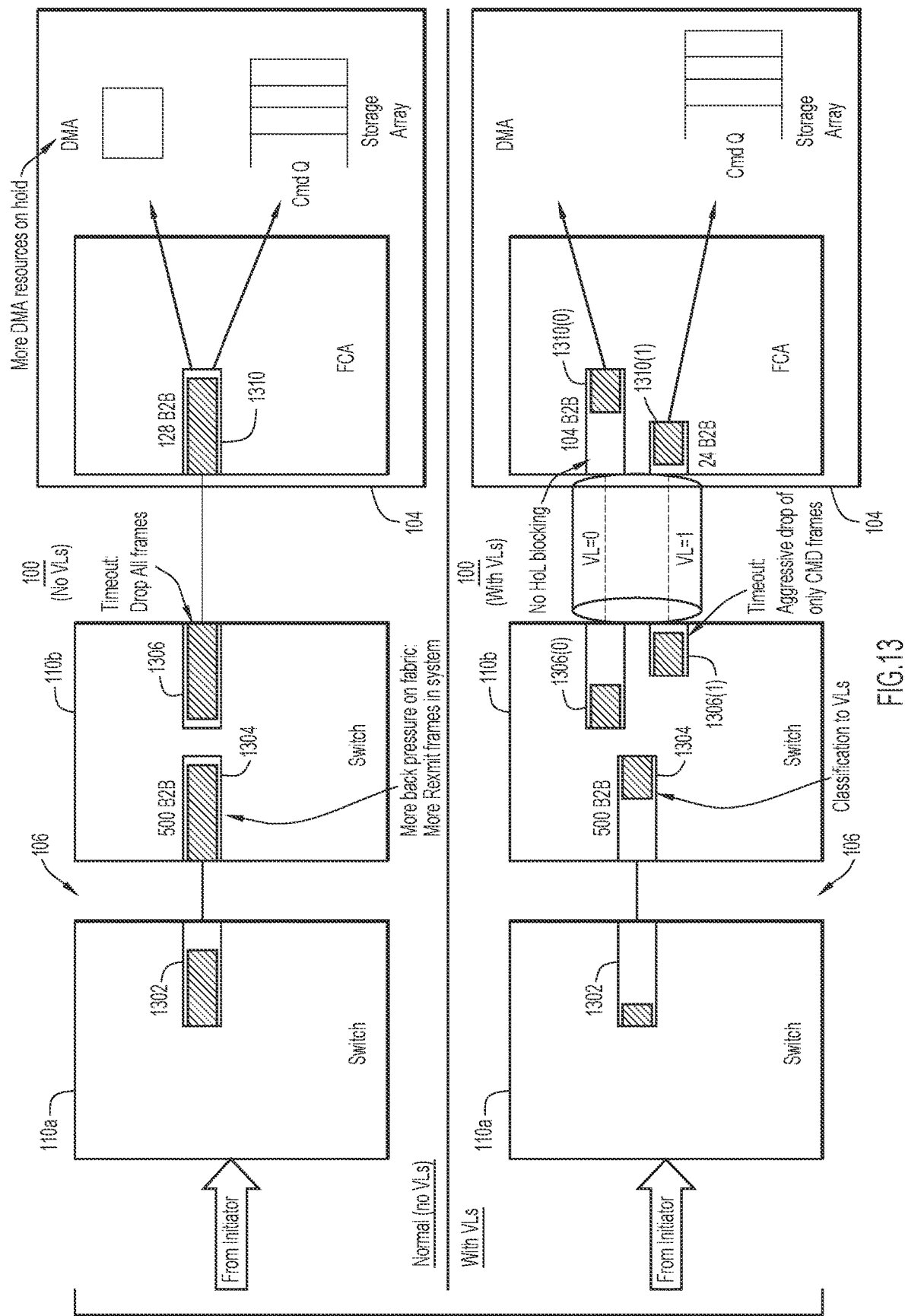
FIG. 13 is an illustration that compares buffer/queue occupancy in the FC SAN when the FC SAN is operating in a normal/R_RDU mode without virtual lanes against when the FC SAN is operating in the virtual lane/ER_RDY mode with virtual lanes, according to an example embodiment.

With reference to FIG. 13, there is an illustration that compares (i) at the top of FIG. 13, buffer/queue occupancy in FC SAN 100 when the FC SAN is operating in the normal/R_RDY mode and VLs are not used, and (ii) at the bottom of FIG. 13, buffer/queue occupancy in FC SAN 100 when the FC SAN is operating in the VL/ER_RDY mode and VLs are used. In FIG. 13, shading in buffers/queues represents frame occupancy. In FC SAN 100 without VLs, fabric switch queues 1302, 1304, and 1306 and undivided target Rx FIFO 1310 (no VLs) all show relatively full occupancy. This puts hold pressure on DMA resources in FC adapter 402.

In contrast, in FC SAN 100 with VLs V0, V1 as described above, fabric switch queues 1302 and 1304 show lower (non-full) occupancies than for the case when the VLs are not used. Also, division of fabric switch queues 1306 into virtual queues 1306(0) for VL0 and 1306(1) for VL1, respectively, each show lower occupancy than does undivided queue 1306. Similarly, division of target Rx FIFO 1310 into Data Rx FIFO 1310(0) for VL0 and CMD Rx FIFO 1310(1) for VL1, respectively, results in lower occupancy in each of the virtualized Rx FIFOs. This lessens hold pressure on the DMA resources. Also, use of the aggressive drop of only CMD_IUs further reduces pressure on the DMA resources.

Figure 14:
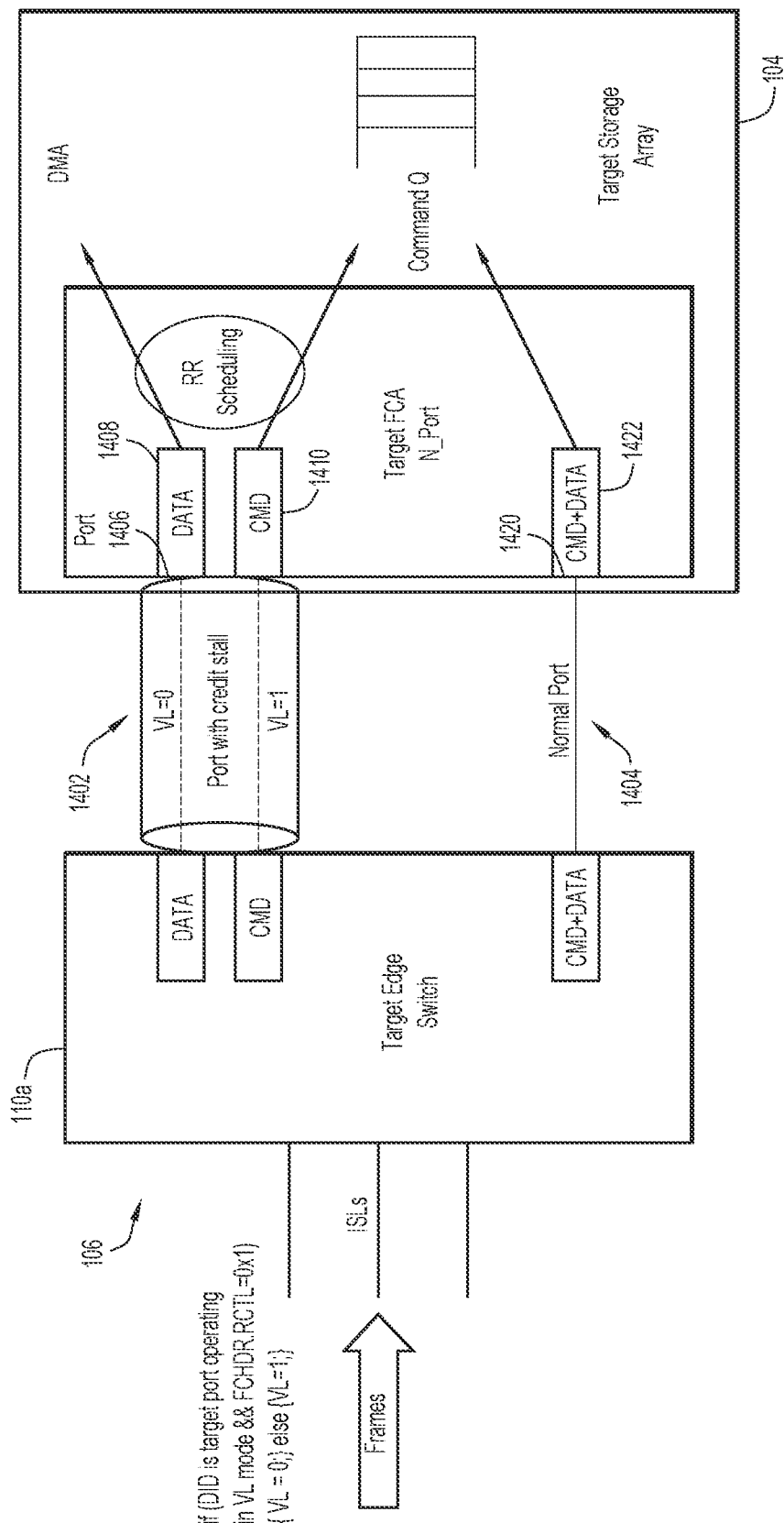
FIG. 14 is an illustration of a fabric edge switch and the target communicating with each other over a link that uses virtual lanes and a link that does not use virtual lanes, according to an example embodiment.

With reference to FIG. 14, there is an illustration of fabric edge switch 110a of switch fabric 106 and target 104 communicating with each other over both (i) a first link 1402 using VLs, and (ii) a second link 1404 not using VLs, i.e., operating normally. For first link 1402, target 104 includes a first target port 1406 that feeds both Data Rx FIFO 1408 for VL0 and CMD Rx FIFO 1410 for VL1. Fabric edge switch 110a marks command frames/data frames destined for target port 1406 for virtual command lane VL1/virtual data lane VL0, as described above, and transmits them to the target port. For second link 1404, target 104 includes a second target port 1420 that feeds a single Rx FIFO 1422. Fabric edge switch 110a transmits frames destined for the second target port without marking the frames.

Figure 15:
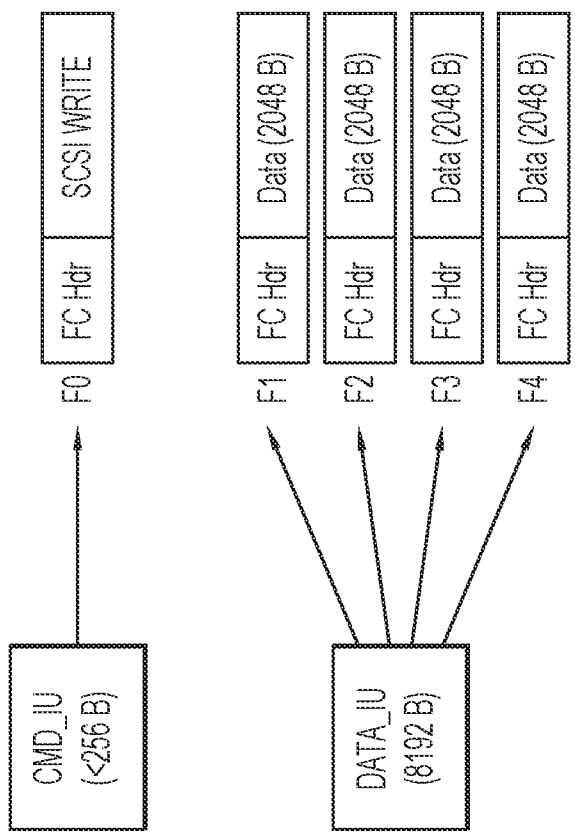
FIG. 15 is an illustration of relative sizes of a command frame and a data frame, according to an example embodiment.

With reference to FIG. 15, there is an illustration of relative sizes of a 2K byte CMD_IU and an 8K byte Data_IU. The CMD_IU is communicate in a single frame F0, including an FC header (Hdr) and a SCSI Write command. The Data_IU is divided into four approximately 2K byte frames F1-F4 each respectively having an FC header and a data payload.

Figure 16:
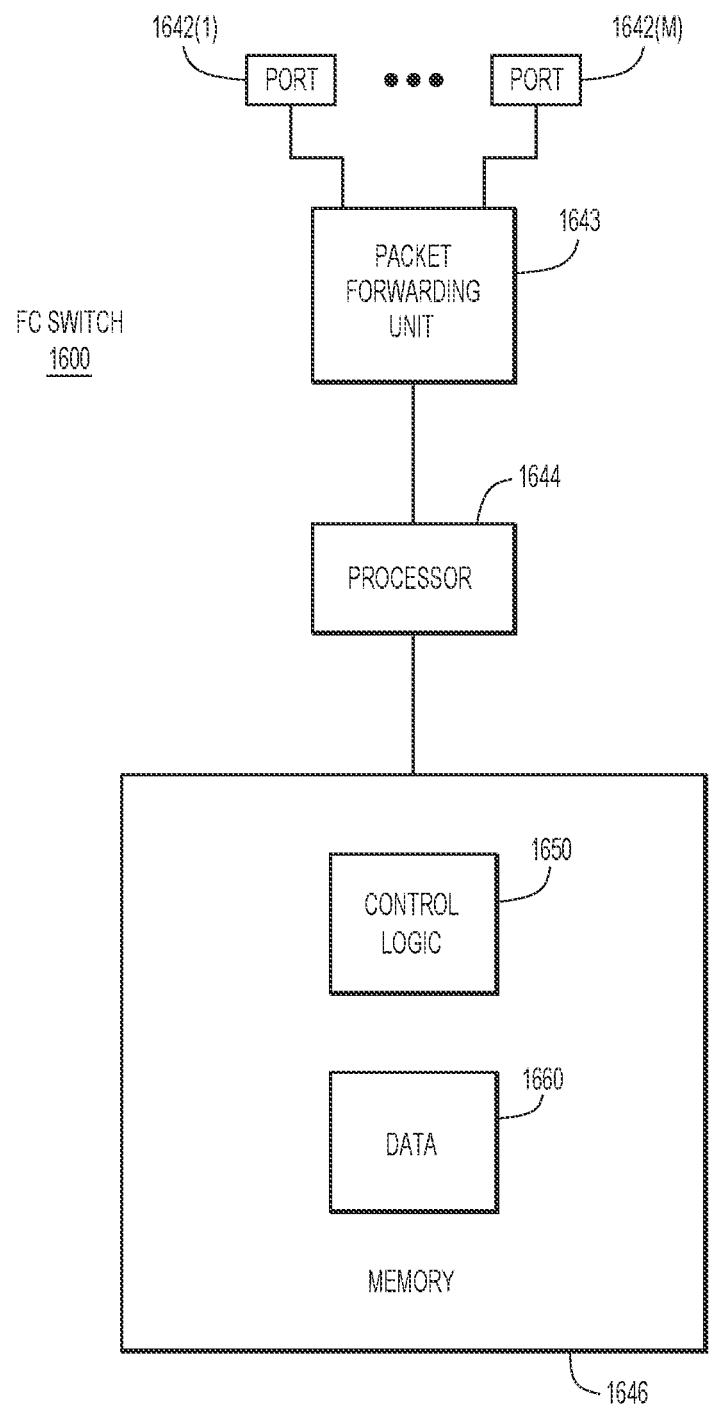
FIG. 16 is a block diagram of an FC switch of the switch fabric, according an example embodiment.

With reference to FIG. 16, there is a block diagram of an FC switch 1600 of switch fabric 106 configured to perform operations described above. FC switch 1600 may be representative of each of FC switches 110a and 110b. FC switch 1600 comprises a plurality of FC ports 1642(1)-1642(M) to send FC frames/packets transporting SCSI information to a network (including, e.g., other FC switches in switch fabric 106, initiator 102, and storage array/target 104) and receive FC frames/packets transporting with SCSI information to the network, a packet forwarding/processing unit 1643, a network processor 1644 (also referred to simply as "processor"), and a memory 1646. The packet forwarding/processing unit 1643 is, for example, one or more application specific integrated circuits that include buffers, queues, and other control logic for performing packet forwarding operations. The packet forwarding/processing unit may store ACL entries. The processor 1644 is a microcontroller or microprocessor that is configured to perform higher-level controls of FC switch 1600. To this end, the memory 1646 stores software instructions that, when executed by the processor 1644, cause the processor 1644 to perform a variety of operations including operations described herein. Memory 1646 also stores data 1660 used and generated by control logic 1650.

Memory 1646 may comprise read only memory (ROM), random access memory (RAM), magnetic disk storage media devices, optical storage media devices, flash memory devices, electrical, optical, or other physical/tangible memory storage devices. Thus, in general, the memory 1646 may comprise one or more tangible (e.g., non-transitory) computer readable storage media (e.g., a memory device) encoded with software comprising computer executable instructions and when the software is executed (by the processor 1644) it is operable to perform the operations described herein in connection with logic 1650.

Figure 17:
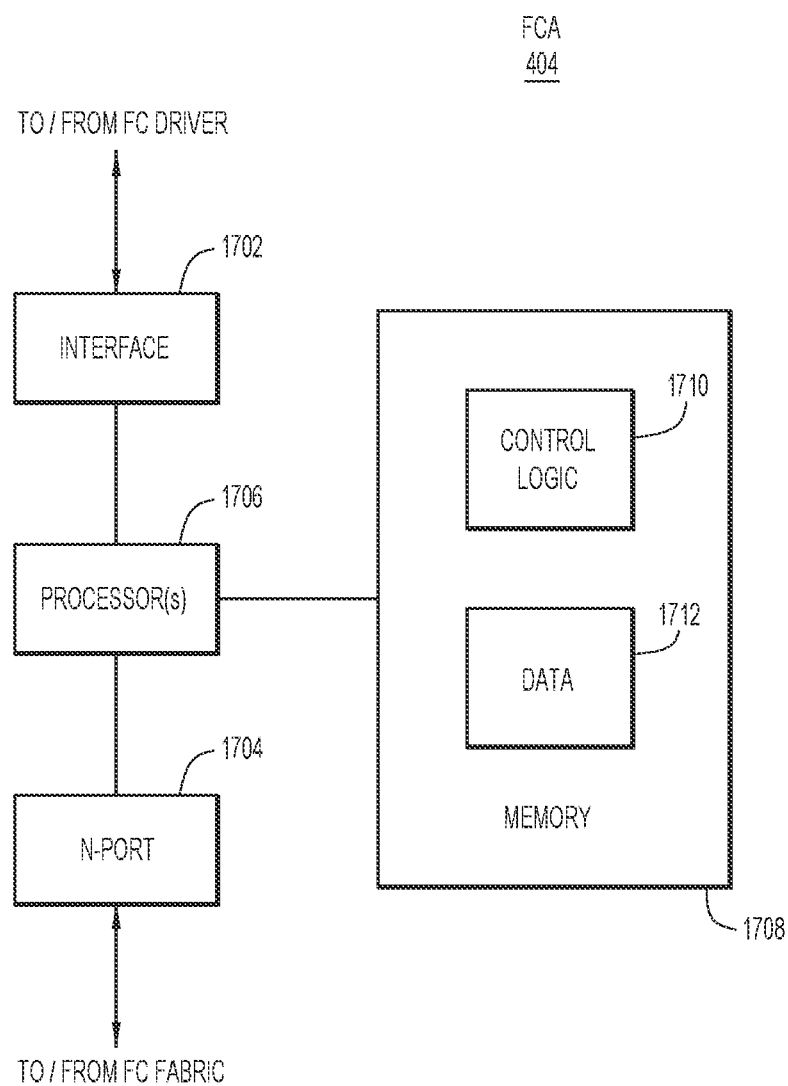
FIG. 17 is a block diagram of an FC adapter of the target, according an example embodiment.

With reference to FIG. 17, there is a high-level block diagram of FC adapter 402, according to an embodiment. FC adapter 402 includes an interface (I/F) 1702 to communicate bi-directionally with an FC driver (e.g., FC driver 404), an N-Port 1704 to communicate bi-directionally with switch fabric 106, a processor 1706, and a memory 1708. The aforementioned components of FC adapter 402 may include one or more application specific integrated circuits that include transmit and receive buffers, queues, control logic, and firmware for performing FC adapter operations described herein. Processor 1706 may be a microcontroller or microprocessor that is configured to perform high-level control of FC adapter 402, assist with data (frame) transfers between interface 1702 and N-port 1704. Memory 1708 stores software and/or firmware instructions that, when executed by processor 1706, cause the processor to perform a variety of operations including operations described herein. For example, memory 1708 stores instructions for control logic 1710 to perform methods described herein. Memory 1708 also stores data 1712 used and generated by control logic 1710.

Memory 1708 may comprise read only memory (ROM), random access memory (RAM), flash memory devices, electrical, optical, or other physical/tangible memory storage devices. Thus, in general, memory 1708 may comprise one or more tangible (e.g., non-transitory) computer readable storage media (e.g., a memory device) encoded with software comprising computer executable instructions and when the software is executed (by processor 1706) it is operable to perform the operations described herein in connection with logic 1710.

In summary, according to embodiments presented herein, a switch fabric classifies traffic/frames toward a stalled target port of a target into CMD_IUs vs. Data_IUs and transmits the frames to the target port. The target port enqueues the frames into separate VLs, including a virtual command lane and a virtual data lane. The virtual command lane and the data lanes are mapped into a Command Q of the target and DMA transfers, respectively. The virtual command lane is aggressively monitored for TxWait and is either dropped or responds to the initiator with a Busy status. This eliminates HoL blocking, reduces the amount of frame re-transmissions due to timeout drops, eliminates holding up of DMA resources and limits the spillover effect of slow drain into the switch fabric. The net result is a better performing switch fabric even in presence of credit-stalled Target Ports. The embodiments may be implemented with changes in FC adapter firmware and switch fabric software, and minimal changes to the FC driver interfacing to FC adapter firmware to ensure mapping of (VL1 to Command Q) and (VL0 to DMA).

In one form, a method is provided comprising: at a switch fabric configured to communicate with a target port of a storage array: sending frames to the target port responsive to receiving, from the target port, buffer-to-buffer credits that indicate a receive buffer at the target port is available for the frames; and in response to detecting a credit stall at the target port based on withholding of the buffer-to-buffer credits by the target port, operating in a virtual lane mode, including: determining whether a frame destined for the target port is a command frame or a data frame; based on the determining, marking the frame to indicate that the frame is destined for a particular virtual lane among virtual lanes of the receive buffer; and receiving from the target port a per-virtual lane buffer-to-buffer credit that indicates the particular virtual lane is available and, in responsive, sending the frame to the target port.

In another form, an apparatus is provided comprising: switch ports of a switch fabric to communicate with target ports of a storage array; and a processor coupled to the switch ports and configured to perform: sending frames to a target port among the target ports responsive to receiving, from the target port, buffer-to-buffer credits that indicate a receive buffer at the target port is available for the frames; and in response to detecting a credit stall at the target port based on withholding of the buffer-to-buffer credits by the target port, operating in a virtual lane mode, including: determining whether a frame destined for the target port is a command frame or a data frame; based on the determining, marking the frame to indicate that the frame is destined for a particular virtual lane among virtual lanes of the receive buffer; and receiving from the target port a per-virtual lane buffer-to-buffer credit that indicates the particular virtual lane is available and, in responsive, sending the frame to the target port.

In yet another form, a non-transitory computer readable medium is provided. The computer readable medium is encoded with instruction that, when executed by a processor of a switch fabric having switch ports configured to communicate with target ports of a storage array, cause the processor to perform: sending frames to a target port among the target ports responsive to receiving, from the target port, buffer-to-buffer credits that indicate a receive buffer at the target port is available for the frames; and in response to detecting a credit stall at the target port based on withholding of the buffer-to-buffer credits by the target port, operating in a virtual lane mode, including: determining whether a frame destined for the target port is a command frame or a data frame; based on the determining, marking the frame to indicate that the frame is destined for a particular virtual lane among virtual lanes of the receive buffer; and receiving from the target port a per-virtual lane buffer-to-buffer credit that indicates the particular virtual lane is available and, in responsive, sending the frame to the target port.

In a further form, a method is provided comprising: at a Fibre Channel adapter of a storage array, the Fibre Channel adapter including a target port and a receive buffer coupled to the target port, the target port configured to communicate with a link peer, operating in a virtual lane mode, including: partitioning the receive buffer into virtual lanes; receiving, from the link peer, a frame marked with a virtual lane identifier to identify a particular virtual lane of the virtual lanes with which the frame is associated; populating the particular virtual lane based on the virtual lane identifier; processing the frame in the particular virtual lane to remove the frame from the particular virtual lane; and sending, to the link peer, a per-virtual lane buffer-to-buffer credit encoded to indicate the particular virtual lane is available for a subsequent frame.

In a further form, an apparatus is provided comprising: a Fibre Channel adapter of a storage array, the Fibre Channel adapter including a target port configured to communicate with a link peer and a receive buffer coupled to the target port, the Fibre Channel adapter configured to perform operating in a virtual lane mode. The operating in the virtual lane mode including: partitioning the receive buffer into virtual lanes; receiving, from the link peer, a frame marked with a virtual lane identifier to identify a particular virtual lane of the virtual lanes with which the frame is associated; populating the particular virtual lane based on the virtual lane identifier; processing the frame in the particular virtual lane to remove the frame from the particular virtual lane; and sending, to the link peer, a per-virtual lane buffer-to-buffer credit encoded to indicate the particular virtual lane is available for a subsequent frame.

In an even further form, a non-transitory computer readable medium is provided. The computer readable medium is encoded with instruction that, when executed by a processor of a Fibre Channel adapter of a storage array, the Fibre Channel adapter including a target port and a receive buffer coupled to the target port, the target port configured to communicate with a link peer, cause the Fibre Channel adapter to perform: operating in a virtual lane mode including: partitioning the receive buffer into virtual lanes; receiving, from the link peer, a frame marked with a virtual lane identifier to identify a particular virtual lane of the virtual lanes with which the frame is associated; populating the particular virtual lane based on the virtual lane identifier; processing the frame in the particular virtual lane to remove the frame from the particular virtual lane; and sending, to the link peer, a per-virtual lane buffer-to-buffer credit encoded to indicate the particular virtual lane is available for a subsequent frame.

In yet another form, a system is provided comprising: a Fibre Channel adapter of a storage array, the Fibre Channel adapter including a target port and a receive buffer coupled to the target port; and a switch fabric including switch ports to communicate with the target ports of the storage array, and a processor coupled to the switch ports, wherein the Fibre Channel adapter and the switch fabric are configured to interoperate with each other based of virtual lanes and ER_RDY using the methods described above.

The above description is intended by way of example only. Various modifications and structural changes may be made therein without departing from the scope of the concepts described herein and within the scope and range of equivalents of the claims.

What is claimed is:

1. A method comprising:
   at a switch fabric configured to communicate with a target port hosted by a Fibre Channel adapter of a storage array:
   operating in a normal mode without virtual lanes while sending frames to the target port responsive to receiving, from the target port, buffer-to-buffer credits that indicate a receive buffer at the target port is available for the frames; and in response to detecting a credit stall at the target port based on withholding of the buffer-to-buffer credits by the target port, negotiating with the Fibre Channel adapter to cause it to partition the receive buffer into virtual lanes, and transitioning to and operating in a virtual lane mode, including:
determining whether a frame destined for the target port is a command frame or a data frame;
based on the determining, marking the frame to indicate that the frame is destined for a particular virtual lane among the virtual lanes of the receive buffer; and
receiving from the target port a per-virtual lane buffer-to-buffer credit that indicates the particular virtual lane is available and, in response, sending the frame to the target port.

2. The method of claim 1, wherein, when the frame is the command frame:
the marking includes marking the command frame to indicate the command frame is destined for a virtual command lane among the virtual lanes of the receive buffer; and
the receiving from the target port the per-virtual lane buffer-to-buffer credit includes receiving from the target port the per-virtual lane buffer-to-buffer credit encoded to indicate the virtual command lane is available.

3. The method of claim 1, wherein, when the frame is the data frame:
the marking includes marking the data frame to indicate the data frame is destined for a virtual data lane among the virtual lanes of the receive buffer; and
the receiving from the target port the per-virtual lane buffer-to-buffer credit includes receiving from the target port the per-virtual lane buffer-to-buffer credit encoded to indicate the virtual data lane is available.

4. The method of claim 1, wherein:
marking includes marking a control field of the frame.

5. The method of claim 1, further comprising:
in response to detecting the credit stall at the target port, performing a link reset toward the target port; and
performing the negotiating and transitioning after the link reset.

6. The method of claim 1, wherein the detecting the credit stall includes detecting that a time spent waiting to receive one of the buffer-to-buffer credits before sending one of the frames to the target port exceeds a predetermined wait time indicative of the credit stall.

7. The method of claim 1, wherein:
the switch fabric and the storage array are part of a Fibre Channel (FC) storage area network (SAN), the target port is an FC port, and the frames are FC frames; and
the sending the frames and the sending the frame each includes sending from an FC switch port of the FC SAN.

8. The method of claim 1, further comprising, at the Fibre Channel adapter:
receiving the frame at the target port;
storing the frame in the particular virtual lane of the receive buffer based on the marking;
processing the frame from the particular virtual lane; and
after the processing, sending the per-virtual lane buffer-to-buffer credit to the switch fabric.

9. An apparatus comprising:
a switch port of a switch fabric to communicate with a target port hosted by a Fibre Channel adapter of a storage array; and
a processor coupled to the switch port and configured to perform:
operating in a normal mode without virtual lanes while sending frames to the target port responsive to receiving, from the target port, buffer-to-buffer credits that indicate a receive buffer at the target port is available for the frames; and
in response to detecting a credit stall at the target port based on withholding of the buffer-to-buffer credits by the target port, negotiating with the Fibre Channel adapter to cause it to partition the receive buffer into virtual lanes, and transitioning to and operating in a virtual lane mode, including:
determining whether a frame destined for the target port is a command frame or a data frame;
based on the determining, marking the frame to indicate that the frame is destined for a particular virtual lane among the virtual lanes of the receive buffer; and
receiving from the target port a per-virtual lane buffer-to-buffer credit that indicates the particular virtual lane is available and, in response, sending the frame to the target port.

10. The apparatus of claim 9, wherein the processor is configured to perform, when the frame is the command frame:
the marking by marking the command frame to indicate the command frame is destined for a virtual command lane among the virtual lanes of the receive buffer; and
the receiving from the target port the per-virtual lane buffer-to-buffer credit by receiving from the target port the per-virtual lane buffer-to-buffer credit encoded to indicate the virtual command lane is available.

11. The apparatus of claim 9, wherein the processor is configured to perform, when the frame is the command frame:
the marking by marking the data frame to indicate the data frame is destined for a virtual data lane among the virtual lanes of the receive buffer; and
the receiving from the target port the per-virtual lane buffer-to-buffer credit by receiving from the target port the per-virtual lane buffer-to-buffer credit encoded to indicate the virtual data lane is available.

12. The apparatus of claim 9, wherein the processor is further configured to perform:
in response to detecting the credit stall at the target port, initiating a link reset toward the target port; and
negotiating and transitioning after the link reset.

13. A method comprising:
at a Fibre Channel adapter of a storage array, the Fibre Channel adapter including a target port and a receive buffer coupled to the target port, the target port configured to communicate with a link peer, operating in a virtual lane mode, including:
partitioning the receive buffer into virtual lanes to include a command lane for storing command frames and a data lane for storing data frames;
receiving, from the link peer, a frame marked with a virtual lane identifier to identify a particular virtual lane as the command lane when the frame is a command frame and as a data lane when the frame is a data frame;
populating the particular virtual lane based on the virtual lane identifier;

mapping the command lane and the data lane to a command queue and a direct memory access channel for processing the command frame and the data frame;

processing the frame in the particular virtual lane to remove the frame from the particular virtual lane; and sending, to the link peer, a per-virtual lane buffer-to-buffer credit encoded to indicate the particular virtual lane is available for a subsequent frame.

14. The method of claim 13, wherein:

the frame is marked in a control field of the frame.

15. The method of claim 13, wherein mapping is implemented using address pointers.

16. The method of claim 13, wherein, when the frame is the command frame:

the processing includes processing the command frame in the command lane, which removes the command frame from the command lane; and the sending includes sending, to the link peer, the per-virtual lane buffer-to-buffer credit encoded to indicate the command lane is available for a subsequent command frame.

17. The method of claim 16, wherein the processing includes dequeuing the command frame from the command lane into the command queue for the command frames.

18. The method of claim 13, wherein, when the frame is the data frame:

the processing includes processing the data frame in the data lane, which removes the data frame from the data lane; and the sending includes sending, to the link peer, a per-lane buffer-to-buffer credit encoded to indicate the data lane is available for a subsequent data frame.

19. The method of claim 18, wherein the processing includes transferring the data frame to memory of the storage array using the direct memory access channel.

20. The method of claim 13, further comprising, at the Fibre Channel adapter:

prior to operating in the virtual lane mode, operating in a normal mode without using the virtual lanes;

negotiating with the link peer to operate in the virtual lane mode; and responsive to the negotiating, transitioning from operating in the normal mode to operating in the virtual lane mode.

* * * * *